US012542935B2

(12) United States Patent
He et al.

(10) Patent No.: US 12,542,935 B2
(45) Date of Patent: Feb. 3, 2026

(54) METHODS AND APPARATUS TO DETECT DYNAMIC AD INSERTION MISALIGNMENT

(71) Applicant: DIRECTV, LLC, El Segundo, CA (US)

(72) Inventors: Connie Cuiyuan He, San Gabriel, CA (US); Tristan Neima Arian, Houston, TX (US); Navyata Sree Awasthi, Austin, TX (US); Rainier Sumalde Mendoza, Duarte, CA (US)

(73) Assignee: DIRECTV, LLC, El Segundo, CA (US)

( * ) Notice: Subject to any disclaimer, the term of this patent is extended or adjusted under 35 U.S.C. 154(b) by 0 days.

(21) Appl. No.: 18/749,293

(22) Filed: Jun. 20, 2024

(65) Prior Publication Data

US 2025/0392767 A1    Dec. 25, 2025

(51) Int. Cl.
*H04N 21/23* (2011.01)
*H04N 21/234* (2011.01)
*H04N 21/262* (2011.01)
*H04N 21/81* (2011.01)
*H04N 21/8547* (2011.01)

(52) U.S. Cl.
CPC . *H04N 21/23418* (2013.01); *H04N 21/26258* (2013.01); *H04N 21/812* (2013.01); *H04N 21/8547* (2013.01)

(58) Field of Classification Search
CPC ....... H04N 21/23418; H04N 21/26258; H04N 21/812; H04N 21/8547
See application file for complete search history.

(56) References Cited

U.S. PATENT DOCUMENTS

2009/0013356 A1\* 1/2009 Doerr ............... H04N 21/41407
    725/62
2009/0205005 A1\* 8/2009 Ahn .................... H04N 21/4722
    725/136

(Continued)

OTHER PUBLICATIONS

Liu et al., "A Deep Neural Framework to Detect Individual Advertisement (Ad) from Videos," IEEE/CVF Winter Conference on Applications of Computer Vision, Jan. 2023, retrieved from https://www.researchgate.net/publication/365195360_A_Deep_Neural_Framework_to_Detect_Individual_Advertisement_Ad_from_Videos, 10 pages.

(Continued)

*Primary Examiner* — Timothy R Newlin
(74) *Attorney, Agent, or Firm* — Hanley, Flight & Zimmerman, LLC

(57) ABSTRACT

Systems, apparatus, articles of manufacture, and methods are disclosed. An example apparatus to identify advertisement misalignment, the apparatus comprising: interface circuitry; machine-readable instructions; and programmable circuitry to at least one of instantiate or execute the machine-readable instructions to: identify a timestamp using a manifest file of a video stream, the timestamp corresponding to a start of a dynamic advertisement insertion (DAI); form a list of consecutive video segments, the list including at least a content segment that ends at the timestamp and a DAI segment that begins at the timestamp; determine that a transition from the content segment to the DAI segment fails to satisfy a quality threshold; and flag the timestamp as a misalignment.

20 Claims, 15 Drawing Sheets

(56) References Cited

U.S. PATENT DOCUMENTS

| | | | | |
|---|---|---|---|---|
| 2012/0254913 | A1* | 10/2012 | Di Mattia | H04N 21/812 725/34 |
| 2014/0173651 | A1* | 6/2014 | Mathews | H04N 21/6543 725/34 |
| 2015/0237389 | A1* | 8/2015 | Grouf | H04N 21/4882 725/49 |
| 2015/0341812 | A1* | 11/2015 | Dion | H04N 21/6373 370/252 |
| 2019/0028751 | A1* | 1/2019 | Bolot | H04N 21/00 |
| 2019/0349619 | A1* | 11/2019 | Hou | G06N 3/08 |
| 2025/0175657 | A1* | 5/2025 | Chen | H04N 21/812 |

OTHER PUBLICATIONS

Wang et al., "Image Quality Assessment: From Error Visibility to Structural Similarity," IEEE Transactions on Image Processing, vol. 13, No. 4, Apr. 2004, 13 pages.

Stackoverflow, "How to get frame number of Blackdetect result?" dated Jan. 16, 2023, retrieved from https://stackoverflow.com/questions/75128925/how-to-get-frame-number-of-blackdetect-result on Jun. 20, 2024, 2 pages.

Stackoverflow, "Checking images for similarity with OpenCV," dated Jul. 18, 2012, edited Mar. 27, 2024, retrieved from https://stackoverflow.com/questions/11541154/checking-images-for-similarity-with-opencv on Jun. 20, 2024, 7 pages.

Stackoverflow, "timecode of scene change detection ffmpeg", dated Mar. 16, 2015, retrieved from https://stackoverflow.com/questions/29070551/timecode-of-scene-change-detection-ffmpeg on Jun. 20, 2024, 2 pages.

Stackoverflow, "Using FFMPEG: How to do a Scene Change Detection? with timecode?" dated Feb. 27, 2026, retrived from https://stackoverflow.com/questions/35675529/using-ffmpeg-how-to-do-a-scene-change-detection-with-timecode on Jun. 20, 2024, 4 pages.

\* cited by examiner

METHODS AND APPARATUS TO DETECT DYNAMIC AD INSERTION MISALIGNMENT

FIELD OF THE DISCLOSURE

This disclosure relates generally to dynamic advertisement insertion (DAI) and, more particularly, to methods and apparatus to detect dynamic ad insertion misalignment.

BACKGROUND

In recent years, the use of the Internet to deliver content, videos and other media to consumers has increased. Media received using such delivery techniques may be referred to as Over The Top (OTT) streams. Some OTT streams are digital versions of linear channels that are also available Over The Air (OTA) via broadcast network (e.g., by connecting an antenna to a television). Such OTT streams may include both static advertisements that are present in the OTA broadcast and dynamically inserted advertisements (DAI).

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
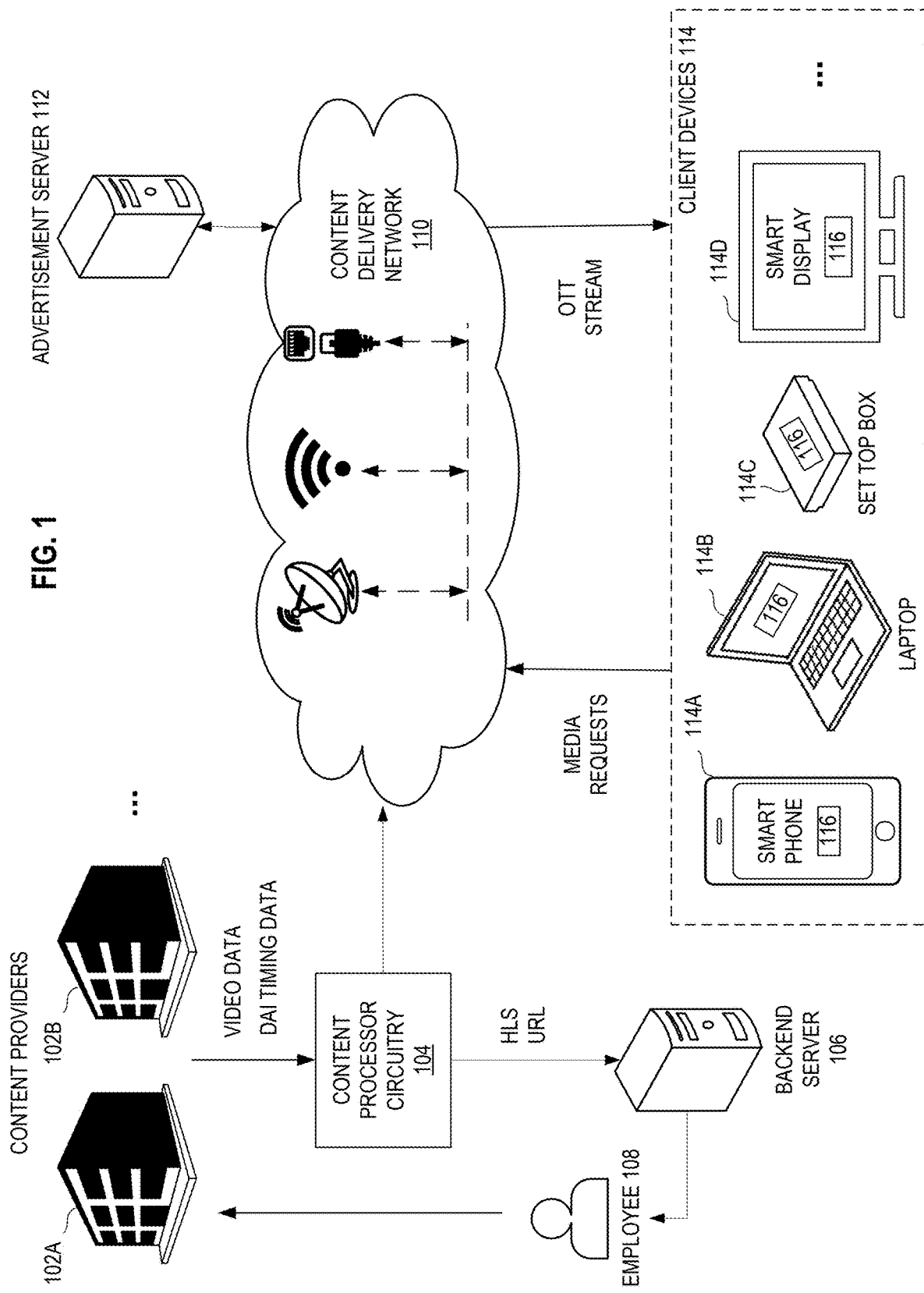
FIG. 1 is a block diagram of an example environment in which an example backend server operates to detect DAI misalignment.

As used above and herein, DAI refers to the process of editing a video stream to include an advertisement that is generated from an external source. When viewing the edited stream, a user would be presented with a first portion of media from the first source (e.g., from a content provider) and an advertisement from a different source.

Server devices that perform DAI operations generally insert advertisements based on timing data provided from the content provider. In some examples, the timing data indicates the DAI should be placed at a time when viewers are expecting an advertisement. However, in other examples, the timing data provided by the content providers is inaccurate. Such an inaccuracy may occur for any reason. In some cases, the inaccuracy is a result of errors within an automated system used by the content providers. Many content providers use automated systems to determine timing data for DAI because the prevalence of OTT streaming and large scale of corresponding data make it impracticable to manually determine where advertisements should be added.

When the timing data provided by a content provider is inaccurate, the device performing DAI operations will follow the instructions and place an advertisement in the video stream at a time when viewers are not expecting one. Such an error may be referred to herein as DAI misalignment. For example, DAI misalignment may occur when the start or end of the DAI may cut-off, or may be cut-off by, other media (e.g., content or another advertisement) within the video stream. The misalignment causes a quick visual transition between different types of media that can be disorienting, confusing, and generally degrades the user experience. Furthermore, DAI misalignment can have financial consequences in use cases where payments between advertisers and content providers are predicated on advertisements running in full.

In some examples, an employee watches an OTT stream after DAI operations have occurred to manually check the OTT stream for DAI misalignment. However, the prevalence of OTT streaming and large scale of corresponding data make such an approach time-consuming, expensive, and difficult to scale. As a result, manual review generally covers only a portion of the available OTT streams. This approach leaves other portions of OTT streams susceptible to errors that are seen by users. Moreover, the relatively small amount of manual review means that when a DAI misalignment is identified, there are relatively few examples of the error available to the content provider. The relatively few examples make troubleshooting and correction of the error challenging. In some examples, troubleshooting DAI misalignment can take two to three weeks using manual review.

Example methods, apparatus, and systems described herein automatically detect DAI misalignment before a corresponding OTT stream is provided to a user. An example backend server receives a manifest file based on a video stream and DAI timing data generated by a content provider. The backend server analyzes two periods of the video stream (which correspond to the beginning of the end of the advertisement as defined by the DAI timing data) to determine whether an aligned black frame(s), a low priority bumper sequence, or an aligned scene change exists within both periods. If either period of the video stream is lacking such video characteristics, the backend server identifies the DAI as misaligned and provides statistics to enable the content provider to correct the timing data. Accordingly, the example backend server can identify DAI misalignment in a manner that is less expensive and more scalable than other approaches. Furthermore, the automated technique described herein generates more examples of DAI misalignment than manual review, thereby making the troubleshooting and correction process easier for content providers.

FIG. 1 is a block diagram of an example environment in which an example backend server operates to detect DAI misalignment. FIG. 1 includes example content providers 102A, 102B (which may be referred to herein as content providers 102), example content processor circuitry 104, an example backend server 106, an example employee 108, an example content delivery network (CDN) 110, an example advertisement server 112, example client devices 114A, 114B, 114C, 114D (which may be collectively referred to herein as client devices 114), and an example application 116.

The content providers 102 provide video data that is eventually presented to a client device 114A in an OTT stream. The video data may be implemented as a linear television channel, a live stream, a video on demand (VoD) or streaming platforms, etc. The video data may correspond to any type of content, including news, sports, television shows, movies, etc. In many examples, the video data also includes advertisements between the content segments. Such advertisements may be referred to as burnt-in advertisements or static advertisements because: a) they are embedded within the original video data generated by the content providers and b) the selection of the static advertisement is pre-determined before a client device 114A begins an OTT stream.

The content providers 102 also generates DAI timing data for the OTT streams. The DAI timing data describes when the video data for the OTT stream should be edited to include an external advertisement. FIG. 1 illustrates two content providers 102 for simplicity. In practice, any number of content providers 102 may generate video data.

The content processor circuitry 104 generates a manifest file based on the video data and the DAI timing data from the content providers 102. As used above and herein, a manifest file refers to text-based data that is used by the client devices 114 to obtain and present an OTT stream. In the example of FIG. 1, data within the manifest file is formatted using a Society of Cable TV Engineers (SCTE) standard and transferred between devices using Hypertext Transfer Protocol (HTTP) Live Streaming (HLS) Unified Resource Link (URL). In other examples, the manifest file is formatted using a different standard and/or transferred using a different communication protocol.

The content processor circuitry 104 provides manifest files to both the client devices 114 (via the CDN 110) and the backend server 106s. When generating a new manifest file based on new data from the content providers 102, the content processor circuitry 104 may first provide the manifest file to the backend server 106 before transmitting the manifest file over the CDN 110. In some examples, the content processor circuitry 104 also performs encoding, packaging, and/or encryption operations when generating and/or transmitting the manifest file.

The content processor circuitry 104 may be implemented using any type of programmable circuitry. Examples of programmable circuitry include but are not limited to programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs).

The backend server 106 uses the manifest file (as obtained via the HLS URL) to detect DAI misalignment as described in the teachings herein. The backend server 106 is controlled by a managing organization. In addition to reviewing OTT streams for DAI misalignment and other quality issues, the managing organization may also negotiate with the content providers 102 to obtain certain content for their customers (e.g. premium cable packages, pay-per-view media, etc.), own and/or operate some or all of the infrastructure that transports the OTT stream data to the client devices (including the content processor circuitry 104), manage the application 116 that runs on the client devices 114, etc.

In the example of FIG. 1, the backend server 106 notifies an employee 108 of the managing organization in response to detecting a DAI misalignment. The employee then 108 communicates with the content providers 102 to inform them of the misalignment, provide examples and statistics for troubleshooting, etc. In other examples, the backend server 106 communicates directly with the content providers 102 in response to a DAI misalignment. The backend server 106 may be implemented using any type of programmable circuitry and is described further in connection with FIG. 2.

After communicating with the employee 108 and/or the backend server 106, the content providers 102 use the examples and troubleshooting data to correct the DAI misalignment. The correction may be implemented by generating new DAI timing data for pre-existing video data. In turn, the content processor circuitry 104 packages the new DAI timing data and pre-existing video data into a new manifest file. The new manifest file is ultimately used by the client devices 114 to obtain an OTT stream with properly aligned DAI. Accordingly, because of the backend server 106, the new manifest file leads to a better user experience than the corresponding previous manifest file that described a DAI misalignment.

The CDN 110 connects and facilitates communication between the content processor circuitry 104, the advertisement server 112, and the client devices 114. In this example, the CDN 110 is the Internet. However, the example CDN 110 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The advertisement server 112 performs DAI operations by providing video data of advertisements to the client devices 114. The advertisements are considered dynamic because the response of the advertisement server 112 may change based on external conditions such as licensing agreements, geography, user preferences, etc. For example, suppose the client devices 114A and 114B are both requesting an advertisement at the same timestamp of the same OTT stream. In response, the advertisement server 112 may provide a first advertisement to the client device 114AA and provide a second, different advertisement to the client device 114AB. The advertisements are also considered inserted because they come from a different source (the advertisement server 112) than the content segments or the static advertisements described above.

The client devices 114 refers to any devices that can communicate via the CDN 110 and execute the application 116. For example, the client devices 114 include but are not limited to smart phones, laptops, smart displays, tablets, etc. The client devices 114 may be implemented using any type of programmable circuitry.

When executing the application 116, the client devices 114 use the manifest file to submit media requests and obtain OTT streams via the CDN 114. To obtain an OTT stream, the client devices 114 use manifest files to request segments of video data at specific time. As used above and herein, a segment refers to a unit of video data (e.g., visual and audio data). When requesting a content segment (e.g., the television show, movie, etc.), the manifest file instructs the client device 114AA to request video data from one of the content providers 102. The manifest file may or may not contain DAI timing data that corresponds to an advertisement segment. If the manifest file does not contain the corresponding DAI timing data, the client device 114AA requests the advertisement segment from one of the content providers 102 and the resulting video data is considered a static advertisement. Alternatively, if the manifest file does contain the corresponding DAI timing data, the client device 114AA requests the advertisement segment from the advertisement server 112 and the resulting video data is considered a DAI.

Figure 2:
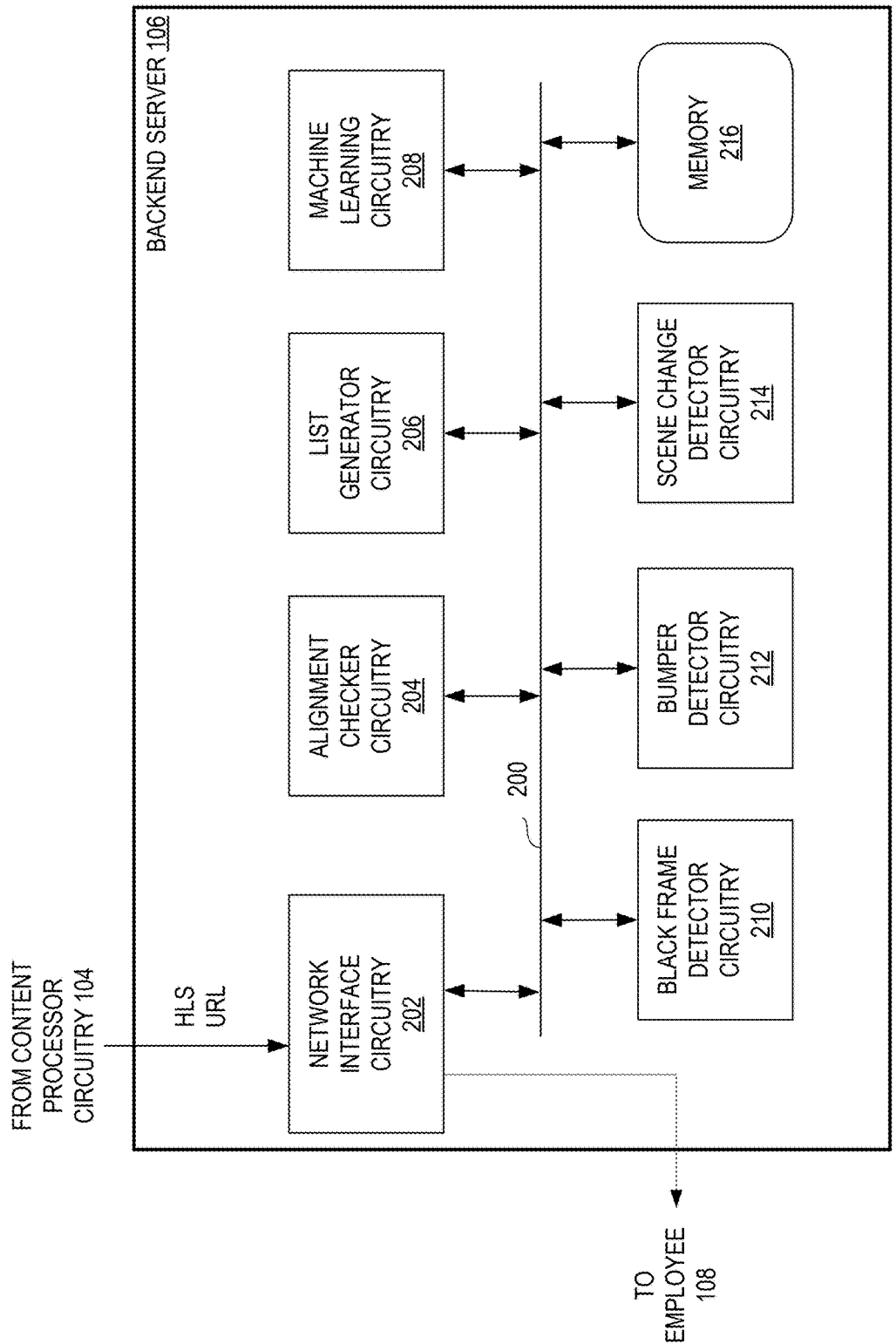
FIG. 2 is a block diagram of an example implementation of the backend server of FIG. 1.

FIG. 2 is a block diagram of an example implementation of the backend server 106 of FIG. 1 to detect DAI misalignment. The backend server 106 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the backend server 106 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers. FIG. 2 shows that the backend server 106 includes an example bus 200, example network interface circuitry 202, example alignment checker circuitry 204, example list generator circuitry 206, example machine learning (ML) circuitry 208, example bumper detector circuitry 212, example black frame detector circuitry 210, example scene change detector circuitry 214, and example memory 216.

The bus 200 refers to one or more physical connections (e.g., an interconnect, copper trace, etc.) that enables communication between the internal components of the backend server 106. The bus 200 may be implemented using one or more communication systems that meet pre-determined threshold power and latency requirements.

The network interface circuitry 202 enables the various components of the backend server 106 to communicate with external devices via a network (e.g., the Internet, a LAN, a WAN, etc.). For example, the network interface circuitry 202 uses the HLS URL to obtain the manifest file from the content processor circuitry 104. In FIG. 2, the network interface circuitry 202 also sends a notification to an electronic device corresponding to the employee 108 when DAI misalignment occurs. The notification may be implemented using any suitable technique, including but not limited to an email corresponding to the employee 108, data provided to a software application used by the employee 108, etc. In some examples, the network interface circuitry 202 is instantiated by programmable circuitry executing network interface instructions and/or configured to perform operations such as those represented by the flowchart(s) of FIGS. 8-12.

Other components of the backend server 106 may additionally use the network interface circuitry 202 to perform various operations. The network interface circuitry 202 may include transceivers, antennas, and/or other hardware components required to send and receive data over a network. Similarly, the network interface circuitry 202 may implement one more network communication protocols to enable the exchange of data over a network.

The alignment checker circuitry 204 checks the manifest file to identify DAI misalignment as described in the teachings herein. To identify DAI misalignment, the alignment checker circuitry 204 first obtains the manifest file from the network interface circuitry 202 via the bus 200. The alignment checker circuitry 204 also sends instructions to, and receives information from, other components of the backend server 106 via the bus 200.

In response to identifying a DAI misalignment, the alignment checker circuitry 204 of FIG. 2 sends instructions to the network interface circuitry 202 (via the bus 200) that cause the network interface circuitry 202 to notify the employee 108 as described above. In other examples, the alignment checker circuitry 204 notifies the employee 108 of DAI misalignment by sending instructions to a display device that is connected to the backend server 106. In some examples, the alignment checker circuitry 204 generates statistics corresponding to the DAI misalignment in addition to the notification. In such examples, the alignment checker circuitry 204 also causes transmission of the statistics to the employee 108 via the bus 200, the network interface circuitry 202, and/or a display device. In some examples, the alignment checker circuitry 204 is instantiated by programmable circuitry executing alignment checker instructions and/or configured to perform operations such as those represented by the flowchart(s) of FIGS. 8-12.

The list generator circuitry 206 forms lists of consecutive video segments based on data within the manifest file and instructions from the alignment checker circuitry 204. In examples described herein, the list generator circuitry 206 forms two lists for every one DAI indicated in the manifest file. The first list includes consecutive video segments both before and after the timestamp where the manifest file indicates the DAI will begin. Similarly, the second list includes consecutive video segments both before and after the timestamp where the manifest file indicates the DAI will end. Accordingly, a given list generated by the list generator circuitry 206 includes content media, DAI media, and some form of a transition between the two. In other examples, the list generator circuitry 206 generates a different number of lists per DAI within the manifest file.

Figure 5:
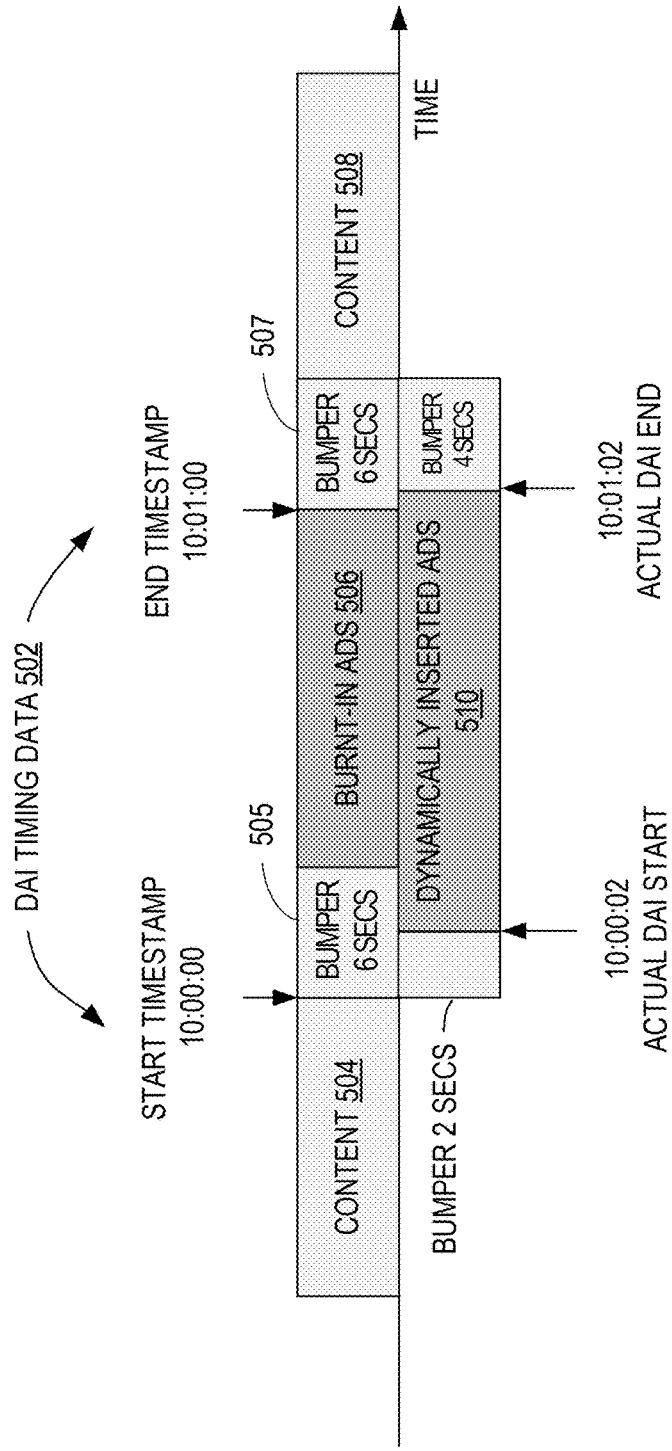
FIG. 5 is an illustrative example of an acceptable user experience where a DAI is aligned with a bumper or a black frame.
Figure 6:
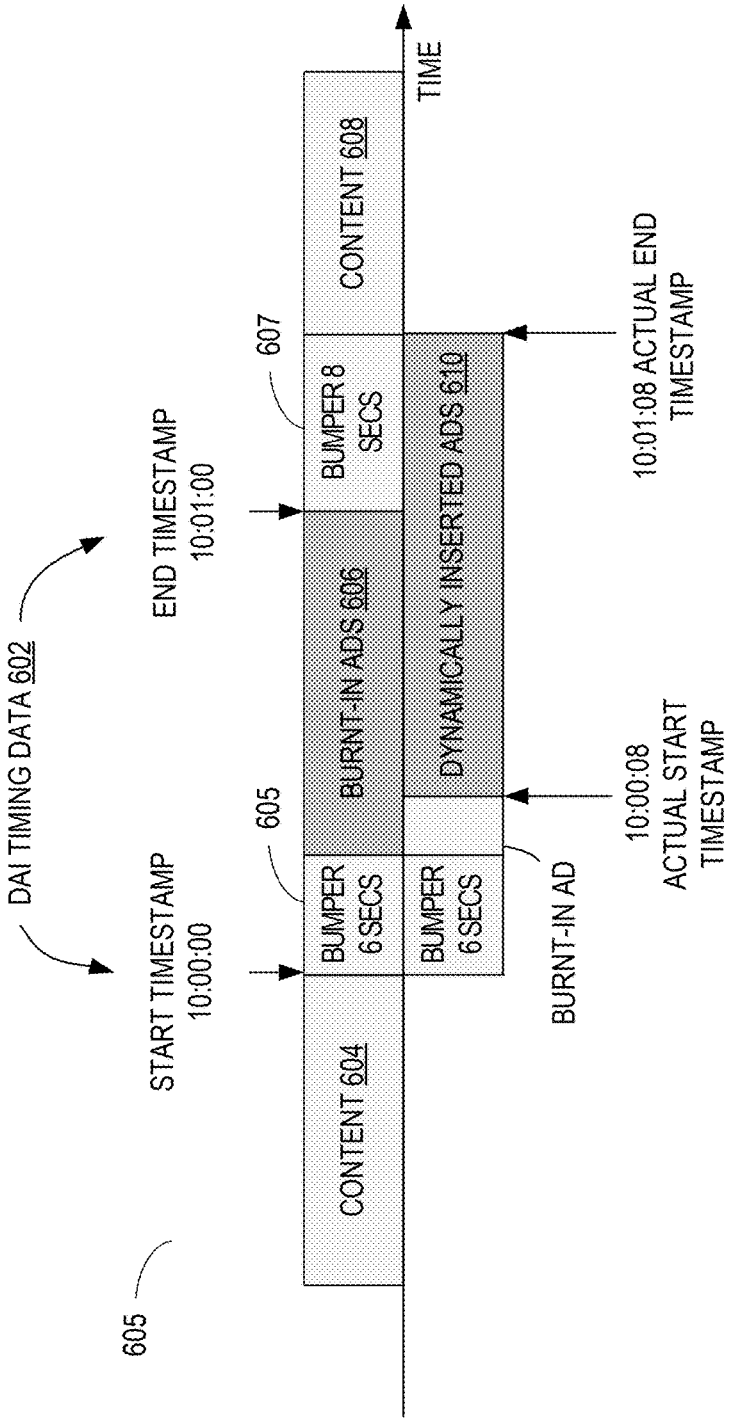
FIG. 6 is an illustrative example of a poor user experience where a DAI is misaligned with a bumper or a black frame.
Figure 7:
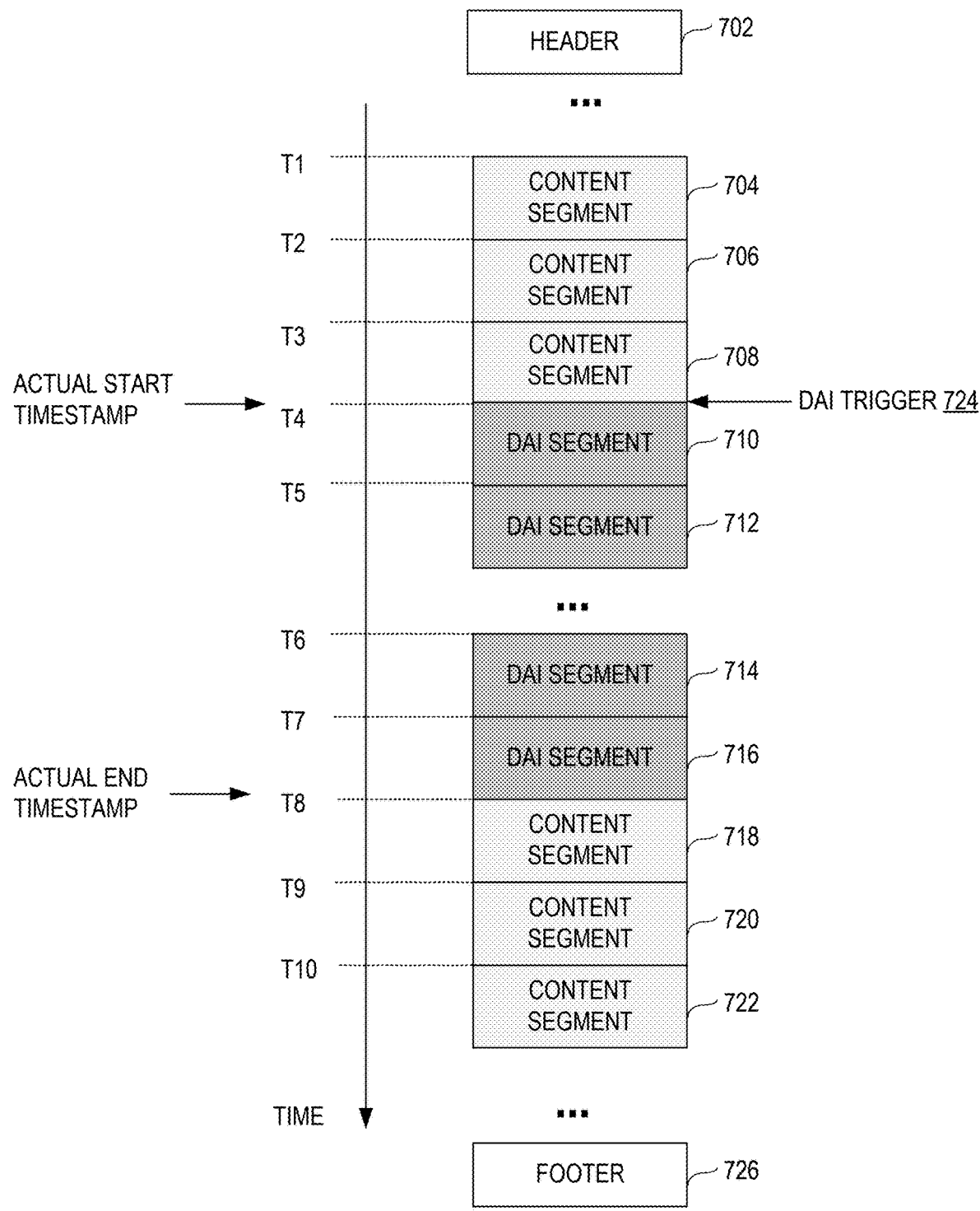
FIG. 7 is an illustrative example of the contents of a manifest file obtained by the backend server of FIG. 1.

Examples of media transitions are discussed further in connection with FIGS. 3-6, and examples of consecutive video segments are discussed further in connection with FIG. 7. In some examples, the list generator circuitry 206 is instantiated by programmable circuitry executing list generator instructions and/or configured to perform operations such as those represented by the flowchart(s) of FIGS. 8-12.

The machine learning circuitry 208 trains and/or executes a machine learning model based on instructions from the alignment checker circuitry 204. In general, the machine learning circuitry 208 performs model training and/or model execution with the goal of determining whether a media transition within a list generated by the list generator circuitry 206 satisfies a quality threshold. The analyses used to determine what transitions satisfy the quality threshold are defined by the alignment checker circuitry 204 and are described further in connection FIGS. 8-12. The alignment checker circuitry 204 also determines: a) when the machine learning circuitry 208 performs model training and/or model execution, and b) the amount of model training and model execution the machine learning circuitry 208 performs (if any). The alignment checker circuitry 204 may determine when and how the machine learning circuitry 208 performs operations for any reason, including but not limited to the accuracy of DAI misalignment identified without machine learning, the accuracy of the machine learning models, the amount of training data available, the amount of computational resources available, timing requirements, cost requirements, etc.

Figure 12:
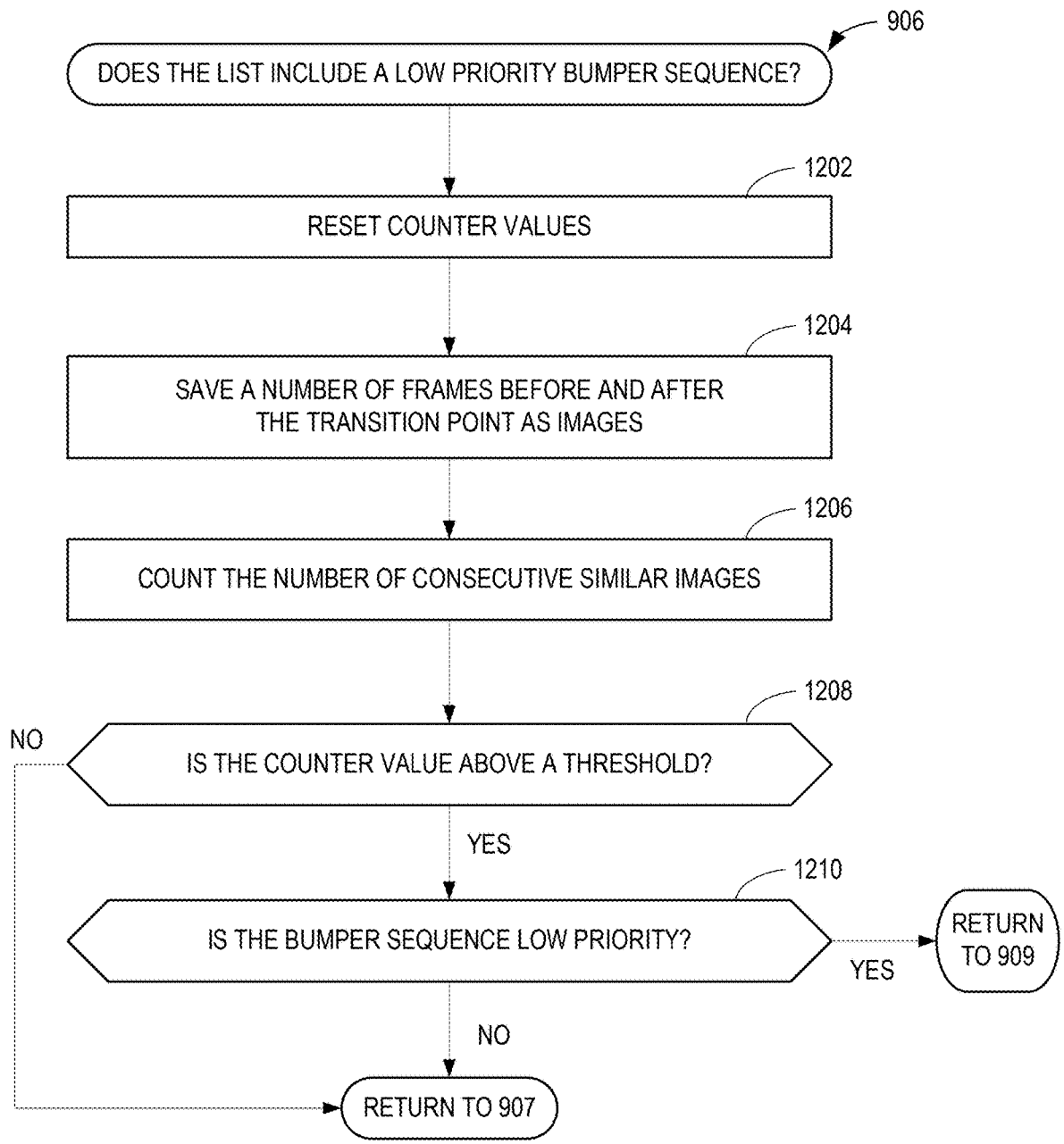
FIG. 12 is a flowchart representative of example machine-readable instructions and/or example operations that may be executed, instantiated, and/or performed by example programmable circuitry to check for a low priority bumper sequence as described in FIG. 9.
Figure 13:
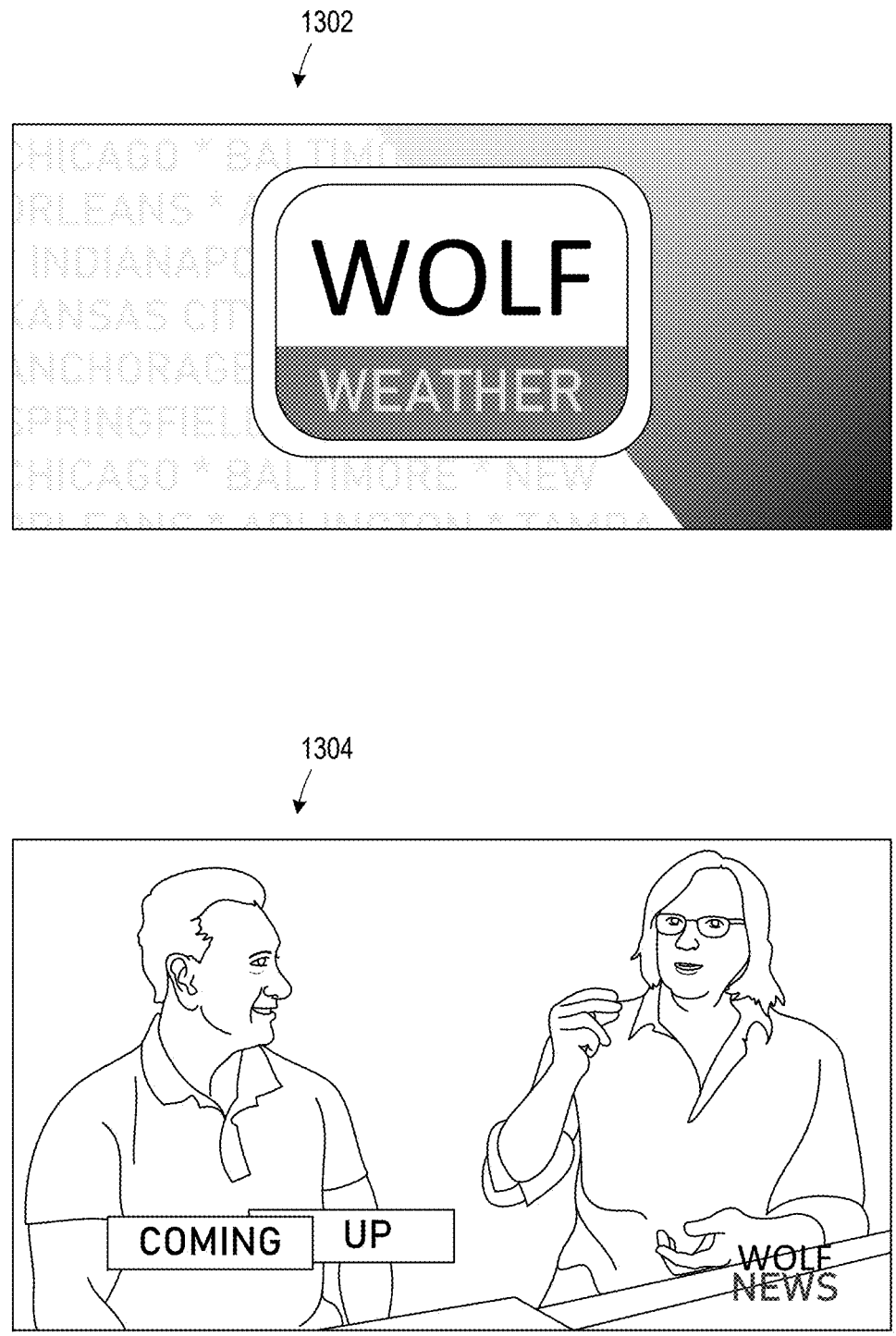
FIG. 13 is an illustrative example of operations that may be performed by the machine learning circuitry of FIG. 2.

Examples of operations performed by the machine learning circuitry 208 are discussed further in connection with FIG. 13. In some examples, the machine learning circuitry 208 is instantiated by programmable circuitry executing machine learning instructions and/or configured to perform operations such as those represented by the flowchart(s) of FIGS. 8-12.

The bumper detector circuitry 212 detects, based on instructions from the alignment checker circuitry 204, whether a bumper sequence exists within a list generated by the list generator circuitry 206. As used above and herein, a bumper sequence refers to video data between actual content (e.g., the television show, the movie, etc.) and an advertisement. Bumper sequences generally serve as a type of station identification and/or announcement. For example, a bumper sequences may include one or more of: a voice over that identifies a title and/or a broadcast network, a logo, theme music, etc. In some examples, a bumper sequence may be referred to as a commercial bumper, an ident bumper, a break-bumper, or, more generally, a bump.

The bumper detector circuitry 212 reports (via the bus 200) to the alignment checker circuitry 204 whether a list of consecutive video segments contains a bumper sequence. In turn, the alignment checker circuitry 204 uses the analysis from the bumper detector circuitry 212 to determine whether to identify the list of video segments as a DAI misalignment. In some examples, the bumper detector circuitry 212 is instantiated by programmable circuitry executing bumper detector instructions and/or configured to perform operations such as those represented by the flowchart(s) of FIGS. 8-12.

The black frame detector circuitry 210 detects, based on instructions from the alignment checker circuitry 204, whether a one or more black frames exist within a list generated by the list generator circuitry 206. As used above and herein, a black frame refers to a frame of video data whose color data is fully black or nearly black (e.g., within a threshold range of the Red, Green, Blue (RGB) values that define 'fully black'). The black frame detector circuitry 210 reports (via the bus 200) the number and location of black frames within the list of consecutive video segments. In turn, the alignment checker circuitry 204 uses the analysis from the black frame detector circuitry 210 to determine whether to identify the list of video segments as a DAI misalignment. In some examples, the black frame detector circuitry 210 is instantiated by programmable circuitry executing black frame instructions and/or configured to perform operations such as those represented by the flowchart(s) of FIGS. 8-12.

The scene change detector circuitry 214 detects, based on instructions from the alignment checker circuitry 204, whether a scene change exists within a list generated by the list generator circuitry 206. In general, a scene change refers to a transition within media from one combination of setting, characters, and actions (e.g., a first scene) to a different combination of setting, characters, and actions (e.g., a second scene). The scene change detector circuitry 214 may use any suitable techniques to identify a scene change. Examples of such techniques are discussed further in connection with FIG. 12.

The scene change detector circuitry 214 reports (via the bus 200) whether a scene change is detected within the list of consecutive video segments. In turn, the alignment checker circuitry 204 uses the analysis from the scene change detector circuitry 214 to determine whether to identify the list of video segments as a DAI misalignment. In some examples, the scene change detector circuitry 214 is instantiated by programmable circuitry executing scene change instructions and/or configured to perform operations such as those represented by the flowchart(s) of FIGS. 8-12.

The memory 216 stores data used by the other components of the backend server 106 to perform various operations. For example, the memory 216 may store one or more of: the text data that forms the manifest file, the corresponding video data and DAI timing data, the timestamps that form the boundaries of the lists defined by the list generator circuitry 206, results from the bumper detector circuitry 212, black frame detector circuitry 210, and scene change detector circuitry 214, etc. In some examples, the memory 216 stores one or more of: model training data, various model versions, and model execution results. The memory 216 may additionally or alternatively store statistics including but not limited to which manifest files had DAI misalignment, the number, location, and type of misalignment, the which one of the content providers 102 is responsible for the misalignment, etc.

The memory 216 may be implemented as any type of memory. For example, the memory 216 may be a volatile memory or a non-volatile memory. The volatile memory may be implemented by Synchronous Dynamic Random Access Memory (SDRAM), Dynamic Random Access Memory (DRAM), and/or any other type of RAM device. The non-volatile memory may be implemented by flash memory and/or any other desired type of memory device.

In some examples, some or all of the memory 216 may be implemented as a database to store some of all of the foregoing information. In such examples, the memory 216 is implemented by any memory, storage device and/or storage disc for storing data such as, for example, flash memory, magnetic media, optical media, solid state memory, hard drive(s), thumb drive(s), etc. Furthermore, the data stored in the memory 216 may be in any data format such as, for example, binary data, comma delimited data, tab delimited data, structured query language (SQL) structures, etc. While, in the illustrated example, the memory 216 is illustrated as a single device, the memory 216 and/or any other data storage devices described herein may be implemented by any number and/or type(s) of memories. While FIG. 2 shows the memory 216 implemented as an internal component within the backend server 106, some or all of the foregoing information may be stored in an external memory accessible by the backend server 106.

In some examples, the backend server 106 includes means for communicating over a network. For example, the means for network communications may be implemented by network interface circuitry 202. In some examples, the network interface circuitry 202 may be instantiated by programmable circuitry such as the example programmable circuitry 1412 of FIG. 14. For instance, the network interface circuitry 202 may be instantiated by the example microprocessor 1500 of FIG. 15 executing machine executable instructions such as those implemented by at least blocks 802, 818 of FIG. 8. In some examples, the network interface circuitry 202 may be instantiated by hardware logic circuitry, which may be implemented by an ASIC, XPU, or the FPGA circuitry 1600 of FIG. 16 configured and/or structured to perform operations corresponding to the machine-readable instructions. Additionally or alternatively, the network interface circuitry 202 may be instantiated by any other combination of hardware, software, and/or firmware. For example, the network interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the backend server 106 includes means for checking for DAI misalignment. For example, the means for checking may be implemented by alignment checker circuitry 204. In some examples, the alignment checker circuitry 204 may be instantiated by programmable circuitry such as the example programmable circuitry 1412 of FIG. 14. For instance, the alignment checker circuitry 204 may be instantiated by the example microprocessor 1500 of FIG. 15 executing machine executable instructions such as those implemented by at least blocks 814, 902-906, 1004-1008, 1106-1108, and 1204-1208 of FIGS. 8-12. In some examples, the alignment checker circuitry 204 may be instantiated by hardware logic circuitry, which may be implemented by an ASIC, XPU, or the FPGA circuitry 1600 of FIG. 16 configured and/or structured to perform operations corresponding to the machine-readable instructions. Additionally or alternatively, the alignment checker circuitry 204 may be instantiated by any other combination of hardware, software, and/or firmware. For example, the alignment checker circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the backend server 106 includes means for generating a list of video segments. For example, the means for generating may be implemented by list generator circuitry 206. In some examples, the list generator circuitry 206 may be instantiated by programmable circuitry such as the example programmable circuitry 1412 of FIG. 14. For instance, the list generator circuitry 206 may be instantiated by the example microprocessor 1500 of FIG. 15 executing machine executable instructions such as those implemented by at least blocks 810 of FIG. 8. In some examples, the list generator circuitry 206 may be instantiated by hardware logic circuitry, which may be implemented by an ASIC, XPU, or the FPGA circuitry 1600 of FIG. 16 configured and/or structured to perform operations corresponding to the machine-readable instructions. Additionally or alternatively, the list generator circuitry 206 may be instantiated by any other combination of hardware, software, and/or firmware. For example, the list generator circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the backend server 106 includes means for training a machine learning model and/or means for executing a machine learning model. For example, the means for training and the means for executing may be implemented by machine learning circuitry 208. In some examples, the machine learning circuitry 208 may be instantiated by programmable circuitry such as the example programmable circuitry 1412 of FIG. 14. For instance, the machine learning circuitry 208 may be instantiated by the example microprocessor 1500 of FIG. 15 executing machine executable instructions such as those implemented by at least blocks 1106, 1110, and 1208 of FIGS. 11 and 12. In some examples, the machine learning circuitry 208 may be instantiated by hardware logic circuitry, which may be implemented by an ASIC, XPU, or the FPGA circuitry 1600 of FIG. 16 configured and/or structured to perform operations corresponding to the machine-readable instructions. Additionally or alternatively, the machine learning circuitry 208 may be instantiated by any other combination of hardware, software, and/or firmware. For example, the machine learning circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the backend server 106 includes means for detecting a bumper sequence. For example, the means for detecting a bumper sequence may be implemented by bumper detector circuitry 212. In some examples, the bumper detector circuitry 212 may be instantiated by programmable circuitry such as the example programmable circuitry 1412 of FIG. 14. For instance, the bumper detector circuitry 212 may be instantiated by the example microprocessor 1500 of FIG. 15 executing machine executable instructions such as those implemented by at least blocks 904, 1102-1106, 1110 of FIG. 11. In some examples, the bumper detector circuitry 212 may be instantiated by hardware logic circuitry, which may be implemented by an ASIC, XPU, or the FPGA circuitry 1600 of FIG. 16 configured and/or structured to perform operations corresponding to the machine-readable instructions. Additionally or alternatively, the bumper detector circuitry 212 may be instantiated by any other combination of hardware, software, and/or firmware. For example, the bumper detector circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the backend server 106 includes means for determining a black frame transition. For example, the means for determining a black frame transition may be implemented by black frame detector circuitry 210. In some examples, the black frame detector circuitry 210 may be instantiated by programmable circuitry such as the example programmable circuitry 1412 of FIG. 14. For instance, the black frame detector circuitry 210 may be instantiated by the example microprocessor 1500 of FIG. 15 executing machine executable instructions such as those implemented by at least blocks 902, 1002 of FIGS. 9 and 10. In some examples, the black frame detector circuitry 210 may be instantiated by hardware logic circuitry, which may be implemented by an ASIC, XPU, or the FPGA circuitry 1600 of FIG. 16 configured and/or structured to perform operations corresponding to the machine-readable instructions. Additionally, or alternatively, the black frame detector circuitry 210 may be instantiated by any other combination of hardware, software, and/or firmware. For example, the black frame detector circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In some examples, the backend server 106 includes means for determining a scene change. For example, the means for determining a scene change may be implemented by scene change detector circuitry 214. In some examples, the scene change detector circuitry 214 may be instantiated by programmable circuitry such as the example programmable circuitry 1412 of FIG. 14. For instance, the scene change detector circuitry 214 may be instantiated by the example microprocessor 1500 of FIG. 15 executing machine executable instructions such as those implemented by at least blocks 906, 1202, 1208 of FIGS. 9 and 12. In some examples, the scene change detector circuitry 214 may be instantiated by hardware logic circuitry, which may be implemented by an ASIC, XPU, or the FPGA circuitry 1600 of FIG. 16 configured and/or structured to perform operations corresponding to the machine-readable instructions. Additionally or alternatively, the scene change detector circuitry 214 may be instantiated by any other combination of hardware, software, and/or firmware. For example, the scene change detector circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

Figure 3:
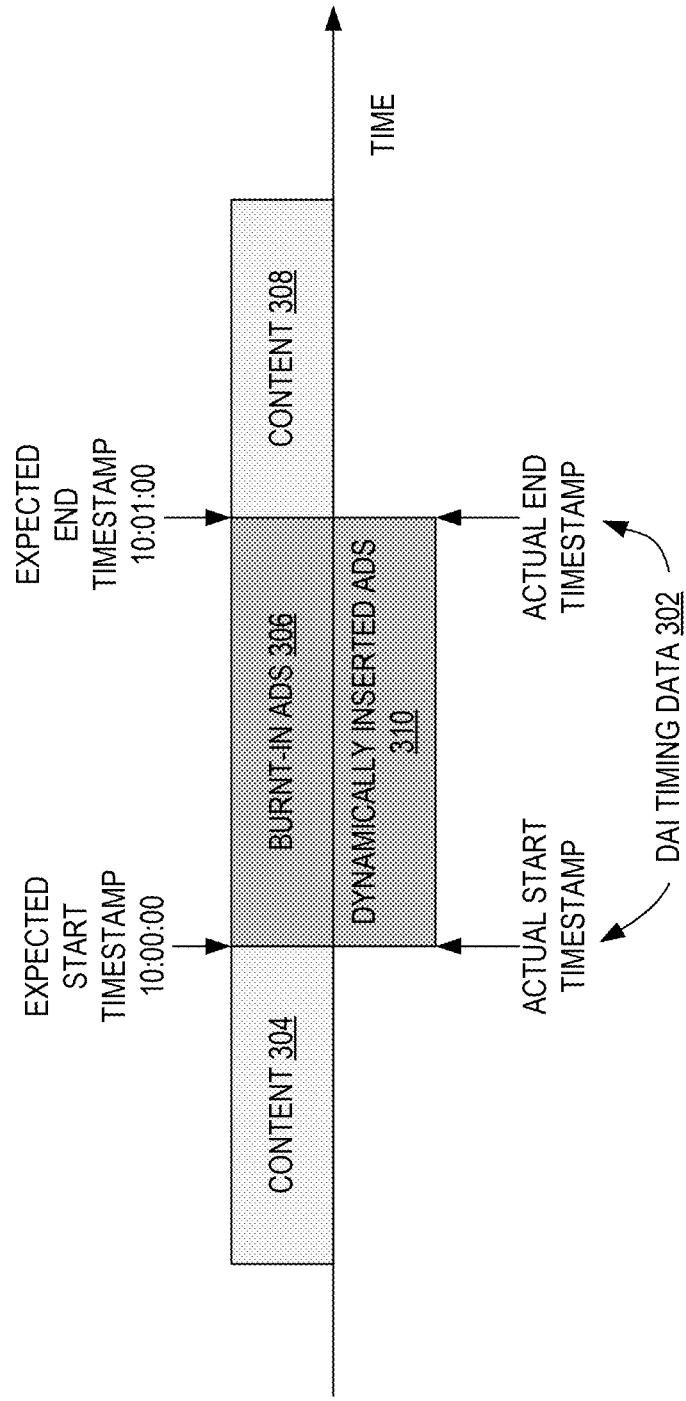
FIG. 3 is an illustrative example of an acceptable user experience where a DAI is aligned with a scene transition.

FIG. 3 is an illustrative example of an acceptable user experience where a DAI is aligned with a scene transition. FIG. 3 includes example DAI timing data 302, example content video data 304 and 308, example burnt-in advertisement video data 306, and example DAI video data 310. While examples described herein refer to the content provider 102A and the client device 114A for simplicity, the teachings of this disclosure can apply to any of the content.

In the example of FIG. 3, the scene change detector circuitry 214 determines that a scene change exists at 10:00:00 and is used by the content provider 102A to transition from presentation of the content video data 304 to the burnt-in advertisement video data 306. Accordingly, if the DAI video data 310 is meant to replace the burnt-in advertisement video data 306 in the OTT stream presented to the client devices 114, the DAI video data 310 should also start at or near 10:00:00 (e.g., within a threshold range of 10:00:00) to avoid misalignment with the burnt-in advertisement video data 306.

In some examples, the timestamp 10:00:00 as determined with the foregoing techniques is referred to as an expected start timestamp because the timestamp describes when the alignment checker circuitry 204 expects the DAI video data 310 to begin. As used above and herein, timestamps are formatted in an 'HH:MM:SS' format where HH refers to a number of hours, MM refers to a number of minutes, and SS refers to a number of seconds.

In the example of FIG. 3, the scene change detector circuitry 214 also determines that a scene change exists at 10:01:00 and is used by the content provider 102A to transition from presentation of the burnt-in advertisement video data 306 to the content video data 308. Accordingly, if the DAI video data 310 is meant to replace the burnt-in advertisement video data 306 in the OTT stream presented to the client devices 114, the DAI video data 310 should also end at or near 10:01:00 (e.g., within a threshold range of 10:01:00) to avoid misalignment with the burnt-in advertisement video data 306. In some examples, the timestamp 10:01:00 as determined with the foregoing techniques is referred to as an expected end timestamp because the timestamp describes when the alignment checker circuitry 204 expects the DAI video data 310 to end.

The DAI timing data 302 refers to data within the manifest file that can be used by the alignment checker circuitry 204 to determine when the DAI video data 310 is scheduled to begin and end. In examples described herein, DAI timing data includes a reference to a timestamp where the DAI video data begins (e.g., 10:00:00 in FIG. 3) and a duration of how long the DAI video data lasts (e.g., one minute in FIG. 3). In some example, the foregoing timestamp is referred to as an actual start timestamp because it describes where the content prover 102A has determined the DAI video data 310 will actually begin. In contrast, the expected start timestamp is an internal value determined by the described backend server 106 that may or may not align with when the DAI video data 310 will actually begin.

The alignment checker circuitry 204 adds the duration to the first timestamp to obtain a second timestamp (e.g., 10:01:00 in FIG. 3) that describes the end of the DAI and resumption of the content. The foregoing timestamp computed by the alignment checker circuitry 204 may be referred to as an actual end timestamp because it refers to when the DAI video data 310 will actually end. In other examples, the DAI timing data 302 is formatted differently, but can still be used by the alignment checker circuitry 204 to determine the actual start timestamp and the actual end timestamp. For instance, the DAI timing data 302 may include advertisement pre-roll data.

In the example of FIG. 3, both a) the actual start timestamp matches the expected start timestamp, and b) the actual end timestamp matches the actual end timestamp. Accordingly, the content provider 102A has correctly used the DAI timing data 302 to indicate the DAI video data 310 will begin and end at the same times when the burnt-in advertisement video data 306 will begin and end. Therefore, the alignment checker circuitry 204 will determine that both: a) the transition from content video data 304 to the DAI video data 310 and b) the transition from DAI video data 310 to the content video data 308 satisfy the quality threshold because both transitions are aligned with scene changes.

Figure 4:
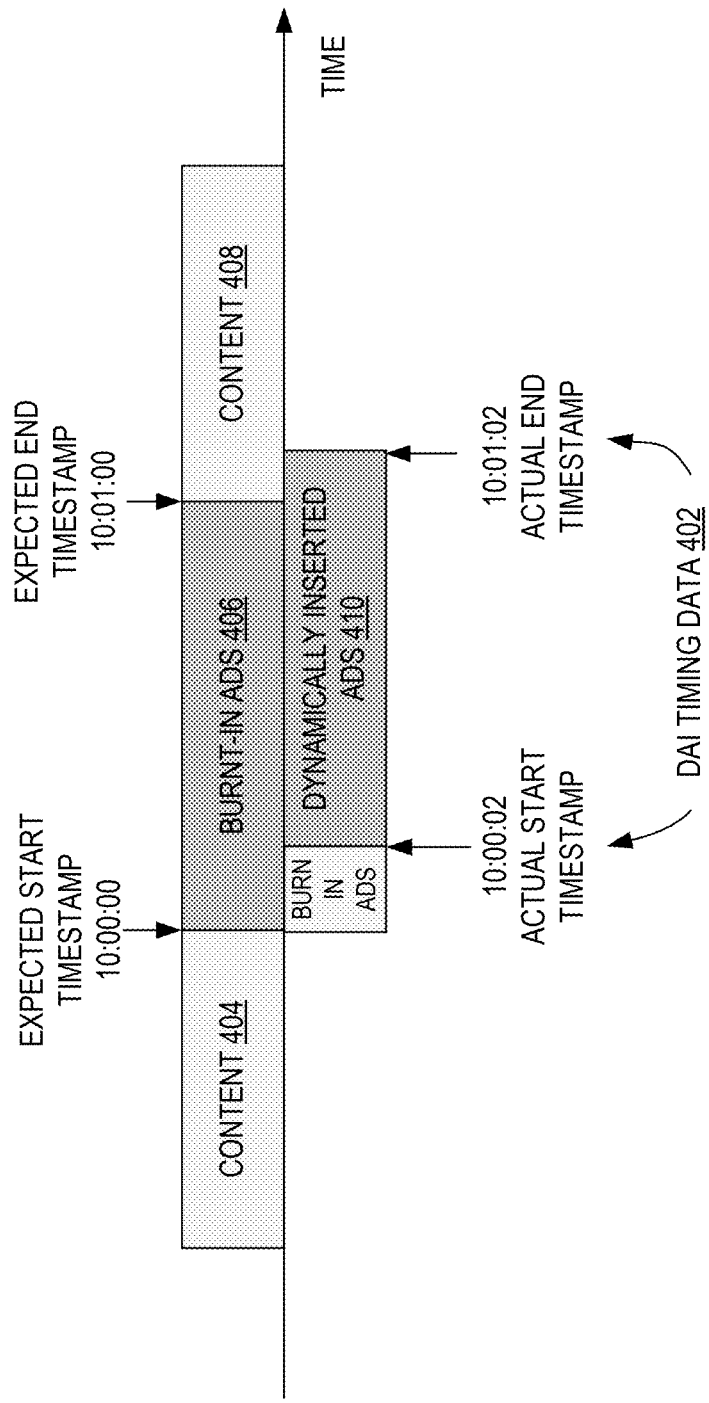
FIG. 4 is an illustrative example of a poor user experience where a DAI is misaligned with a scene transition.

FIG. 4 is an illustrative example of a poor user experience where a DAI is misaligned with a scene transition. FIG. 4 includes example DAI timing data 402, example content video data 404 and 408, example burnt-in advertisement video data 306, and example DAI video data 410.

Like the example of FIG. 3, the scene change detector circuitry 214 uses the video data of FIG. 4 to identify: a) a scene change at 10:00:00, and b) a scene change at 10:01:00. Accordingly, the expected start timestamp of FIG. 4 is 10:00:00 and the expected end timestamp is 10:01:00.

In the example of FIG. 4, the DAI timing data 402 from the content provider 102A indicates the DAI video data 410 should start at 10:00:02 (the actual start timestamp) and have a duration of one minute (thereby making the actual end timestamp 10:01:02). If the manifest file is left unedited, the difference between the actual start timestamp and the expected start timestamp would result in the client device 114A presenting two seconds of the burnt-in advertisement video data 406 before cutting, without a scene change, to presentation of the DAI video data 410. The cut between video sources lowers the quality of the user experience because it occurs without notice and without any kind of visual or audio transition. Accordingly, the alignment checker circuitry 204 would identify the beginning of the DAI video data 410 as misaligned with the scene change and notify the employee 108 of the error. The alignment checker circuitry 204 may further provide the expected start timestamp and/or the actual start timestamp to the employee 108 as statistics.

In the example of FIG. 4, the misalignment at the start of the DAI video data 410 also causes issues at the end of the DAI video data 410. If the manifest file is left unedited, the difference between the actual end timestamp and the expected end timestamp would result in the user missing the first two seconds of the content video data 408 because the DAI video data 410 is still being presented. Moreover, the cut from the DAI video data 410 to the content video data 408 also lowers the user experience because it occurs without notice and without any visual or audio transition. As such, the alignment checker circuitry 204 would identify the end of the DAI video data 410 as misaligned with the scene change and notify the employee 108 of the error. The alignment checker circuitry 204 may further provide the expected end timestamp and/or the actual end timestamp to the employee 108 as statistics.

FIG. 5 is an illustrative example of an acceptable user experience where a DAI is aligned with a bumper or a black frame. FIG. 5 includes example DAI timing data 502, example content video data 504 and 508, example bumper video data 505 and 507, example burnt-in advertisement video data 506, and example DAI video data 510.

While bumper sequences can provide a form of station identification to viewers as described above, they also serve as a built-in form of protection from some amount of DAI timing differences. In examples described herein, a DAI that cuts-off part of a bumper sequence or replaces a bumper sequence entirely is not considered a form of DAI misalignment because bumper sequences are generally deprioritized relative to content and advertisements. The managing organization and/or content provider 102A may instruct the backend server 106 to deprioritize the presence of bumper sequences for any reason, including but not limited to: advertisers do not generally pay for the presence of a bumper sequence, a user does not generally lose critical information by missing some or all of a bumper sequence, etc. Additionally, because video frames in bumper sequences are relatively static (compared to video frames in content and advertisements), a transition from the middle of a bumper sequence to a DAI is generally considered not confusing or visually disrupting to a user like a transition from a burnt-in advertisement to a DAI would be. However, in other examples, the alignment checker circuitry 204 does consider a DAI that cuts-off part of a bumper sequence or replaces a bumper sequence entirely to be a form of DAI misalignment. Such a prioritization of bumper sequences may be based on preferences set by the managing organization and/or content provider 102A.

In the example of FIG. 5, the bumper detector circuitry 212 detects that a six second bumper sequence begins at 10:00:00. Accordingly, the alignment checker circuitry 204 considers 10:00:00 as the start of a period where a DAI can be positioned (because DAIs can interfere with bumper sequences as discussed above) and the video data between 10:00:00 and 10:00:06 is labeled bumper video data 505. Similarly, the bumper detector circuitry 212 detects that a second six second bumper sequence ends at 10:01:06. Accordingly, the alignment checker circuitry 204 considers 10:01:06 as end of the period where the DAI can be positioned, and the video data between 10:01:00 and 10:01:06 is labeled bumper video data 507.

The DAI timing data 502 from the content provider 102A indicates the DAI video data 510 should start at 10:00:00 and have a duration of one minute (thereby providing an end timestamp 10:01:00). Despite indicating the DAI will start at 10:00:00, the bumper detector circuitry 212 detects a two second bumper sequence at this timestamp. Accordingly, the DAI video data 510 does not begin until 10:00:02. The bumper detector circuitry 212 also detects a four second bumper sequence after the DAI, which indicates to the alignment checker circuitry 204 ends at 10:01:02.

In the example of FIG. 5, the DAI video data 510 is misaligned with the DAI timing data 502 and is unequal in duration to the burnt-in advertisement data 506. However, because the DAI video data 510 is cutting off the bumper video data 505 and 507 and not cutting off any of the content video data 504, 508 or the burnt-in advertisement data 506, the user experience is not degraded by the transitions to/from the DAI video data 510 and the alignment checker circuitry 204 considers both transitions as aligned.

In some examples, the content provider 102A includes one or more black frames between the content video data 504, 508 and the burnt-in advertisement data 506. These black frames have a shared purpose with bumper sequences in that both serve as a built-in form of protection from some amount of DAI timing differences. Therefore, the alignment checker circuitry 204 does considers a DAI that cuts off or entirely replaces a sequence of black frames to be properly aligned. The alignment checker circuitry 204 makes such a determination for the same reasons described above in FIG. 5 with respect to bumper sequences.

FIG. 6 is an illustrative example of a poor user experience where a DAI is misaligned with a bumper or a black frame. FIG. 6 includes example DAI timing data 602, example content video data 604 and 608, example bumper video data 605 and 607, example burnt-in advertisement video data 606, and example DAI video data 610.

While bumper sequences and black frames do provide some protection against DAI timing differences, their mere presence does not preclude a DAI from being misaligned. In the example of FIG. 6, the bumper detector circuitry 212 detects that a six second bumper sequence begins at 10:00:00 and an eight second bumper sequence begins at 10:01:00. Accordingly, the alignment checker circuitry 204 considers 10:00:00 as the beginning of a DAI alignment window and 10:01:08 as end of the DAI window as discussed above.

In the example of FIG. 6, the DAI timing data 602 from the content provider 102A indicates the DAI video data 610 should start at 10:00:00 and have a duration of one minute (thereby providing an end timestamp 10:01:00). Despite indicating the DAI will start at 10:00:00, the bumper detector circuitry 212, the bumper detector circuitry 212 detects a six second bumper sequence beginning at 10:00:00 and the scene change detector circuitry 214 detects a scene change at 10:00:08. The alignment checker circuitry 204 to determine that when the DAI video data 610 begins at 10:00:08, it cuts off two seconds of the burnt-in advertisement video data 606 that began to play after the bumper video data 605. As such, the alignment checker circuitry 204 considers the start of the DAI video data 610 to be misaligned and notifies the employee 108 of the error.

Notably, a start of a DAI that is misaligned does not necessarily mean the end of the DAI is also misaligned. For example, the presence of the bumper video data 607 prevents the end of the DAI from cutting off the content video data 608 because, even with the offset from the start timestamp, the DAI video data 610 still ends at the same time as the bumper video data 607 (at 10:01:08). As such, the alignment checker circuitry 204 would consider the end of the DAI video data 610 to be properly aligned. More generally, for a given DAI, the actual start timestamp, the actual end timestamp, both timestamps, or neither timestamps may be misaligned with the corresponding video data generated by the content provider 102A.

FIG. 7 is an illustrative example of the contents of a manifest file obtained by the backend server of FIG. 1. FIG. 7 includes example header data, example content segments 704, 706, 708, 718, 720, and 722, example DAI segments 710, 712, 714, and 716, an example DAI trigger 724, and example foot der data. The content segments and DAI segments may be collectively referred to as video segments 704-722.

FIG. 7 also describes a timeline with time stamps corresponding to the video segments 704-722. The timeline includes timestamps T1 through T10 positioned such that T1 marks where video segment 704 begins, T2 marks where video segment 706 begins, etc. Furthermore, the timestamps are numbered chronologically so that T1 occurs before T2, which occurs before T3, etc.

In between the header data 702 and the footer data 726, the manifest file generated by the content processor circuitry 104 includes textual data that are instructions used by the client device 114A to obtain the data that composes an OTT stream. For example, the portion of the manifest file corresponding to the content segment 704 instructs the client device 114A which video file will be played and when the video file will be played (e.g., at TI as shown in FIG. 7). In examples described herein, the manifest file is formatted using the Extensible Markup Language (XML) and SCTE standard. Using the XML and SCTE format, the text used to convey the timestamp T1 and a given video segment 704 may include:

EXTINF: 4.304,
XXX-104.m4v

The manifest file may include additional data corresponding to the content segment 704. Such data may include but is not limited to where the client device 114A should request from the video file from (e.g., an Internet Protocol (IP) address corresponding to the content provider 102A). In other examples, a video segment corresponds to different data in the manifest file and/or has different textual formatting.

As described above, a video segment is a standardized unit such that video files of any two video segments 704-722 are implemented using the same amount of data. Accordingly, any two video segments 704-722 correspond to approximately the same amount of time. In examples described herein, a given video segment corresponds to approximately six seconds. Accordingly, the content providers 102 are likely to group multiple instances of the same type of video segment together when forming the OTT stream. For example, a scene of a television show or movie is likely implemented over multiple content segments that are presented consecutively. Similarly, an ad break between content likely contains multiple advertisement segments. In other examples, a video segment refers to a different amount of data and/or time.

The manifest file includes a DAI trigger 724. A DAI trigger is textual data that can be used by the alignment checker circuitry 204 to determine where the DAI video is scheduled to start and end. That is, the DAI trigger 724 is an example implementation of the DAI timing data 302, 402, 502, and 602 of FIGS. 3-6. In some examples, a DAI trigger may be referred to as a DAI markup. In the example of the FIG. 7, the DAI trigger 724 is formatted as a SCTE tag. In other examples, the DAI trigger 724 is formatted using a different protocol.

The SCTE tag that forms the DAI trigger 724 is text, positioned between the text of video segments 708 and 710, that instructs the client device 114A to begin requesting video files from the advertisement server 112. The alignment checker circuitry 204 uses the position of the DAI trigger 724 to determine that the timestamp of the next video segment (e.g., T4 in FIG. 7) is the actual start timestamp.

The text of the DAI trigger 724 also instructs the client device 114A to continue sending requests to the advertisement server 112 for the next n video segments, where n is any positive integer. In the example of FIG. 7, the nth video segment after the DAI trigger 724 is video segment 716. The alignment checker circuitry 204 uses the value of n within the DAI trigger 724 to label video segments 710-716 as DAI segments (e.g., DAI segments 710-716 collectively form an example implementation of the DAI video data 310, 410, 510, and 610 discussed in FIGS. 3-6). The alignment checker circuitry 204 also used the value of n to determine the timestamp where the nth video segment after the DAI trigger 724 ends (e.g., T8 in FIG. 7) is the actual end timestamp. In other examples, the alignment checker circuitry 204 uses a different technique to determine the actual start timestamp and the actual end timestamp based on the DAI trigger 724.

The alignment checker circuitry 204 provides the actual timestamp and the actual end timestamp to the list generator circuitry 206. As described above, the list generator circuitry 206 generates two lists per chunk of continuous DAI segments (e.g., DAI segments 710-716). A given list produced by the list generator circuitry 206 includes two or more consecutive video segments. For example, the list generator circuitry 206 may include any number of video segments 704-722 in the first list, so long as: a) the segments collectively form a continuous period on the timeline of FIG. 7 and b) the two video segments before and after the actual start timestamp are included (e.g., content segment 708 and DAI segment 710). Similarly, the list generator circuitry 206 may include any number of video segments 704-722 in the second list, so long as: a) the segments collectively form a continuous period on the timeline of FIG. 7 and b) two video segments before and after the actual end timestamp are included (e.g., DAI segment 716 and content segment 718).

The list generator circuitry 206 determines how many consecutive video segments to add to a list based on predetermined configuration parameters set in the memory 216. Because each list generated the list generator circuitry 206 includes at least one content segment and at least one DAI segment, the corresponding video includes some form of a transition between the content and the DAI. The alignment checker circuitry 204 determines the transition within a list passes the quality threshold based on the presence (or lack thereof) of black frames, a bumper sequence, or a scene change within the video files that form the list. The technique used by the alignment checker circuitry 204 to define and apply the quality threshold to a list of video segments is discussed further in connection with FIGS. 7-12.

The use of black frames, bumper sequences, and scene changes within the quality threshold means that the number of video segments in a list may affect the accuracy at which the alignment checker circuitry 204 properly identifies the DAI as aligned or misaligned. For example, suppose a bumper sequence exists in video segment 706 and is close enough to the actual start timestamp to for a human eye to perceive the transition as high quality. Suppose further that the list generator circuitry 206 only refers to the video segments 708 and 710. In such examples, the backend server 106 may inadvertently describe the start of the DAI sequence as misaligned because the bumper sequence that the alignment checker circuitry 204 was looking for was not in the list of video segments. Alternatively, suppose a bumper sequence exists in video segment 704 and is too far away from the start of the DAI timestamp to be considered part of a high-quality transition. If the list generator circuitry 206 includes all of segments 704-712, the alignment checker circuitry 204 would falsely identify the DAI sequence as properly aligned because the list of video segments included an unrelated bumper sequence.

In some examples, the managing organization may adjust the accuracy of the DAI misalignment identification operations performed by the backend server 106 by adjusting the configuration parameters in memory 216 that determine how many video segments are included in a given list. Advantageously, by automating the process of identifying the actual start and actual end timestamps, forming the corresponding lists of video segments, and checking if the transitions within the list satisfy a quality threshold, the backend server 106 can identify DAI misalignment using less time and less cost than manual checks, and provide better support for troubleshooting efforts than manual checks.

While an example manner of implementing the backend server 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the network interface circuitry 202, alignment checker circuitry 204, list generator circuitry 206, ML circuitry 208, example black frame detector circuitry 210, example bumper detector circuitry 212, example scene change detector circuitry 214, and/or, more generally, the example backend server 106 of FIG. 2, may be implemented by hardware alone or by hardware in combination with software and/or firmware. Thus, for example, any of the network interface circuitry 202, the alignment checker circuitry 204, the list generator circuitry 206, the ML circuitry 208, the black frame detector circuitry 210, the bumper detector circuitry 212, the scene change detector circuitry 214, and/or, more generally, the example backend server 106, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example backend server 106 of FIG. 2 may include one or more elements, processes, and/or devices in addition to, or instead of, those illustrated in FIG. 2, and/or may include more than one of any or all of the illustrated elements, processes and devices.

Flowchart(s) representative of example machine-readable instructions, which may be executed by programmable circuitry to implement and/or instantiate the backend server 106 of FIG. 2 and/or representative of example operations which may be performed by programmable circuitry to implement and/or instantiate the backend server 106 of FIG. 2, are shown in FIGS. 8-12. The machine-readable instructions may be one or more executable programs or portion(s) of one or more executable programs for execution by programmable circuitry such as the programmable circuitry 1412 shown in the example programmable circuitry platform 1400 discussed below in connection with FIG. 14 and/or may be one or more function(s) or portion(s) of functions to be performed by the example programmable circuitry (e.g., an FPGA) discussed below in connection with FIGS. 15 and/or 16. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 8-12, many other methods of implementing the example backend server 106 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8-12 may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

Figure 8:
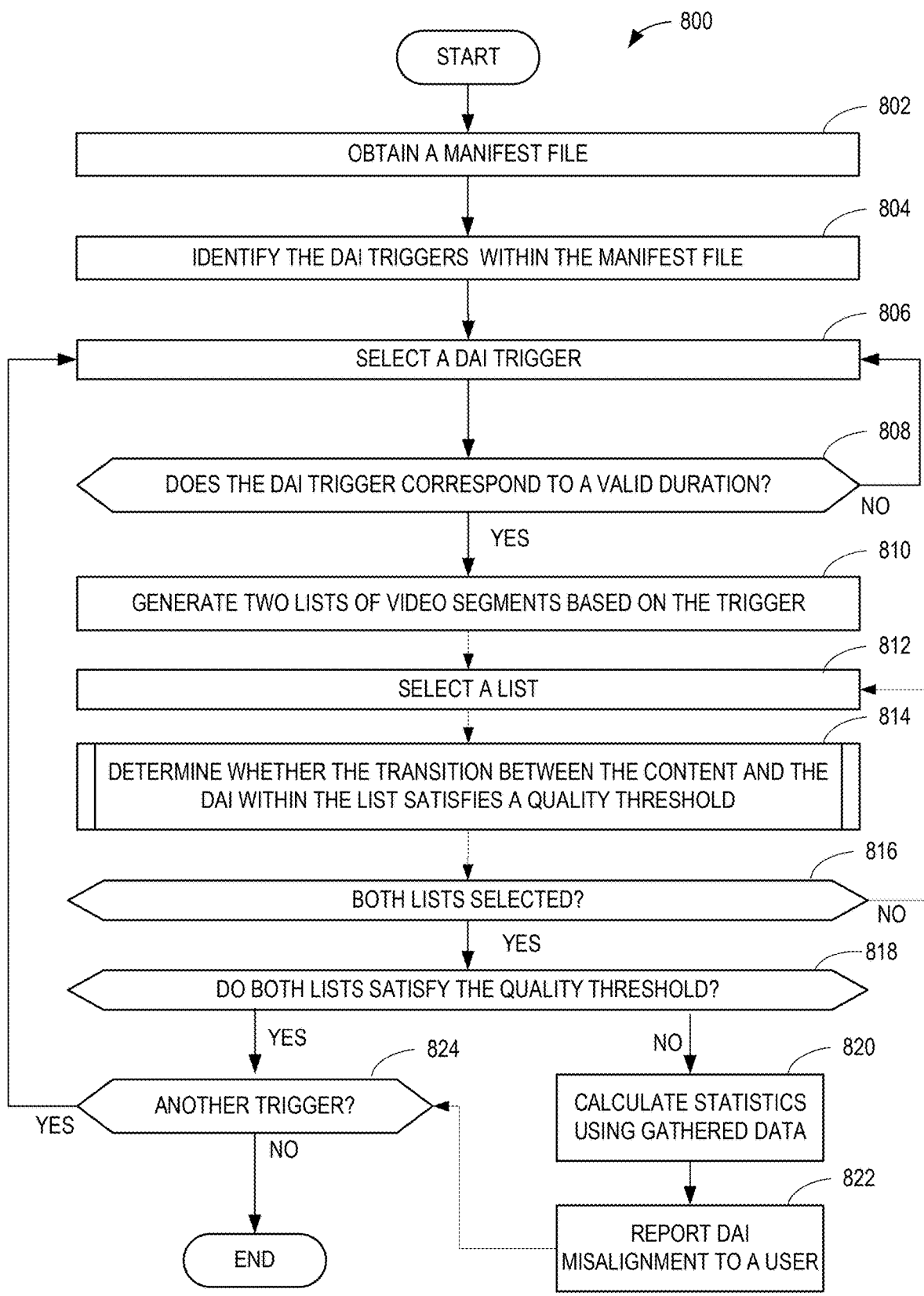
FIG. 8 is a flowchart representative of example machine-readable instructions and/or example operations that may be executed, instantiated, and/or performed by example programmable circuitry to implement the backend server of FIG. 1 to detect DAI misalignment.

FIG. 8 is a flowchart representative of example machine-readable instructions and/or example operations 800 that may be executed, instantiated, and/or performed by programmable circuitry to implement the backend server 106 of FIG. 1 to detect DAI misalignment. The example machine-readable instructions and/or the example operations 800 begin when the network interface circuitry 202 obtains a manifest file. (Block 802). The manifest file includes data describing the chronological sequence of video segments and DAI timing data as discussed above in connection with FIG. 8. In the examples described herein, the network interface circuitry 202 uses an HLS URL to obtain the manifest file from the content processor circuitry 104. In other examples, backend server 106 uses a different technique to obtain the manifest file and/or obtains the manifest file from a different source.

The alignment checker circuitry 204 identifies the DAI triggers within the manifest file. (Block 804). While the illustrative example of FIG. 8 shows one DAI trigger 724 for simplicity, the manifest file may contain any number of DAI triggers. Furthermore, the DAI triggers may be positioned at any locations within the chronological sequence of video segments.

The alignment checker circuitry 204 selects one of the DAI triggers. (Block 806). The alignment checker circuitry 204 then determines if the DAI trigger corresponds to a valid duration. (Block 808). In some examples, a SCTE tag corresponding to a DAI trigger does not include instructions describing how many video segments the client device 114A should request from the advertisement server 112 (e.g., n=0 using the above example discussed in connection with FIG. 8). If the SCTE tag fails to include such instructions (Block 808: No), then the client device 114A will not contact the advertisement server 112, and a DAI will not be inserted into the OTT stream, at the corresponding timestamp. Accordingly, in such examples, control returns to block 806 where the alignment checker circuitry 204 selects another DAI trigger.

If the SCTE tag does instruct the client device 114A to request a nonzero number of video segments from the advertisement server 112, the DAI trigger does correspond to a valid duration (Block 808: Yes). In such examples, the list generator circuitry 206 then generates two lists of segments based on the selected DAI trigger. (Block 810). The first list contains a series of consecutive video segments that include the content segment before the DAI trigger and the DAI segment following the DAI trigger. The second list contains a series of video segments that include the last DAI segment corresponding to the DAI trigger (e.g., where the DAI ends) and the content segment following the last DAI segment (e.g., the DAI segment before the actual end timestamp and the content segment after the actual end timestamp as described above). In other examples, the list generator circuitry 206 generates a different number of lists at block 810.

The alignment checker circuitry 204 selects one of the lists generated at block 810. (Block 812). The alignment checker circuitry 204 then determines whether the transition between the content and the DAI within the list satisfies a quality threshold. (Block 814). The alignment checker circuitry 204 evaluates block 814 based on the presence (or lack thereof) of black frames, a bumper sequence, or a scene change as discussed in connection with FIGS. 9-12.

The alignment checker circuitry 204 determines whether both lists have been selected. (Block 816). If both lists have not been selected (Block 816: No), control returns to block 812 where the alignment checker circuitry selects the other list. The alignment checker circuitry 204 checks whether both lists satisfy the quality threshold (e.g., executes block 814 twice per DAI trigger with a valid duration) because: a) the quality of a DAI is dependent on both the transition at the start of the advertisement and the transition at the end of the advertisement, and b) there are use cases where only one, both, or neither transition at either end of the DAI satisfies the quality threshold.

If both lists have been selected (Block 816: Yes), then the alignment checker circuitry 204 has evaluated both the beginning and end transitions of the DAI. In such examples, the alignment checker circuitry 204 determines whether both lists have satisfied the quality threshold. (Block 818).

If one or both lists fail to satisfy the quality threshold (Block 818: No), the alignment checker circuitry 204 calculates statistics about the DAI using gathered data. (Block 820). Such statistics may include, but are not limited to, a copy of the DAI trigger, the timestamp associated within where the transition was expected to occur, a timestamp associated with where the transition actually occurred, the names or other identifying information of the content provider 102A, the OTT stream, and/or the advertisement server 112 corresponding to the DAI trigger, counting statistics such as the number of identified DAI misalignments that fit a particular category, descriptions of how the misalignment occurred, a description of the minimum and maximum misalignment, a recommendation for how to correct the DAI, etc. In some examples, the information calculated or gathered at block 820 is determined using both lists that correspond to the DAI.

The alignment checker circuitry 204 notifies a user of the DAI misalignment. (Block 822). In the examples described herein, the user is the employee 108 of the managing organization. In other examples, the user maybe any individual. The notification may be implemented using any suitable techniques. Such techniques include but are not limited to sending data to an external device associated with the user (as shown in FIG. 3), updating a display device connected to the backend server 106, etc. The alignment checker circuitry 204 also provides one or more of the foregoing statistics to the user at block 822.

In the example of FIG. 8, the alignment checker circuitry 204 notifies a user after: a) analyzing both lists corresponding to a DAI, and b) determining at least one of the lists fails to satisfy the quality threshold. In other examples, the alignment checker circuitry 204 executes block 822 in a different manner (e.g., once per DAI trigger, on a periodic basis, in bunches after a certain number of DAI misalignments have been identified, etc.)

If both of the lists satisfy the quality threshold (Block 818: Yes), or after reporting a DAI misalignment to a user at block 822, the alignment checker circuitry 204 determines whether to select another DAI trigger. (Block 824). In examples described herein, the alignment checker circuitry 204 continues selecting DAI triggers until all of the DAI triggers identified at block 804 have been selected. In other examples, the managing organization causes the alignment checker circuitry 204 to only select a subset of the DAI triggers identified at block 806 (e.g., to reduce computational resource usage). The managing organization can determine how many DAI triggers to check, and which DAI triggers to check, by setting configuration parameters in the memory 216 that are accessible by the alignment checker circuitry 204.

If the alignment checker circuitry 204 does select another trigger (Block 824: Yes), control returns to block 806 where the alignment checker circuitry 204 selects a DAI trigger that has not yet been selected. If the alignment checker circuitry 204 does not select another trigger (Block 824: No), the machine-readable instructions and/or operations 800 end.

Figure 9:
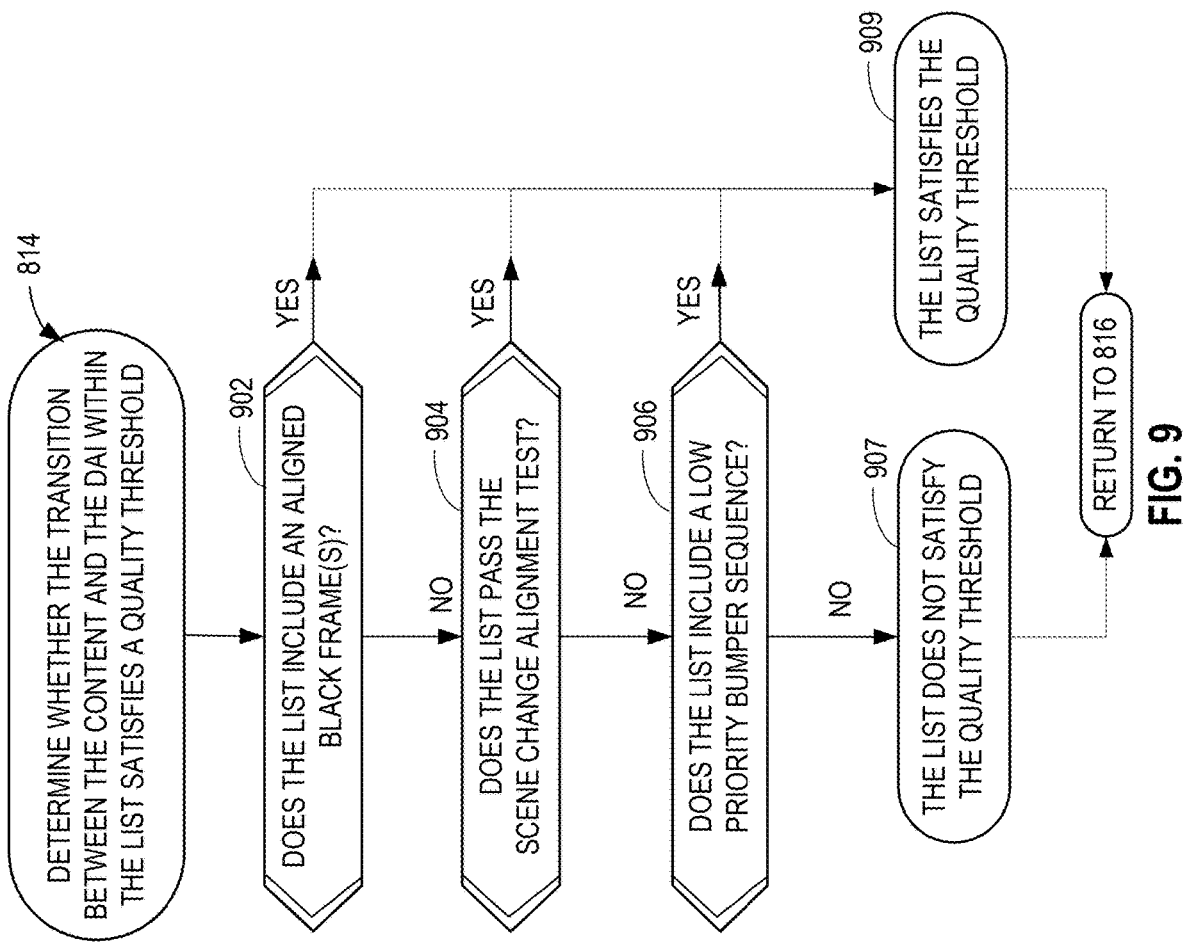
FIG. 9 is a flowchart representative of example machine-readable instructions and/or example operations that may be executed, instantiated, and/or performed by example programmable circuitry to determine whether a transition within a list of video segments satisfies a quality threshold as described in FIG. 8.

FIG. 9 is a flowchart representative of example machine-readable instructions and/or example operations that may be executed, instantiated, and/or performed by example programmable circuitry to determine whether a transition within a list of video segments satisfies a quality threshold as described in FIG. 8. In particular, FIG. 9 is an example implementation of how block 814 of FIG. 8 is implemented.

Execution of block 814 begins when the alignment checker circuitry 204 determines whether the selected list of consecutive video segments includes an aligned black frame(s). (Block 902). To make the determination of block 902, the alignment checker circuitry 204 sends instructions to the black frame detector circuitry 210 (via the bus 200) and analyzes the response. Block 902 is discussed further in connection with FIG. 10.

If the list includes an aligned black frame, (Block 902: Yes), the list satisfies the quality threshold (Block 909). Alternatively, if the list does not include an aligned black frame (Block 902: No), the alignment checker circuitry 204 determines whether the list passes the scene change alignment test. (Block 904). To make the determination of block 904, the alignment checker circuitry 204 sends instructions to the scene change detector circuitry 214 (via the bus 200) and analyzes the response. Block 904 is discussed further in connection with FIG. 11.

If the list passes the scene change alignment test (Block 904: Yes), the list satisfies the quality threshold (Block 909). Alternatively, if the list does not pass the scene change alignment test (Block 904: No), the alignment checker circuitry 204 determines whether the list includes a low priority bumper sequence. (Block 906). To make the determination of block 906, the alignment checker circuitry 204 sends instructions to the bumper detector circuitry 212 (via the bus 200) and analyzes the response. Block 906 is discussed further in connection with FIG. 12.

If the list includes a low priority bumper sequence (Block 906: Yes), the list satisfies the quality threshold (Block 909). Alternatively, if the list does not include a low priority bumper sequence (Block 906: No), the list does not satisfy the quality threshold (Block 907). After either of blocks 907 or 909, control returns to block 816 of FIG. 8.

The flowchart of FIG. 9 shows that, in examples described herein, the alignment checker circuitry 204 determines the list passes the quality threshold if it has an aligned black frame, a scene change alignment, or a low priority bumper sequence. Conversely, a list fails to satisfy the quality threshold (and therefore is identified as a DAI misalignment) if the list does not have an aligned black frame, an aligned scene change, and a low priority bumper.

In examples described herein, the alignment checker circuitry 204 checks for black frames before performing other checks for DAI misalignment because detection of black frames is less computationally expensive than scene change alignment checks or bumper sequence detection. Accordingly, the alignment checker circuitry 204 can lower complexity and improve speed by checking black frames first. In other examples, the alignment checker circuitry 204 analyzes the quality threshold by implementing one or more of blocks 902-906 in parallel or in a different sequential order.

Figure 10:
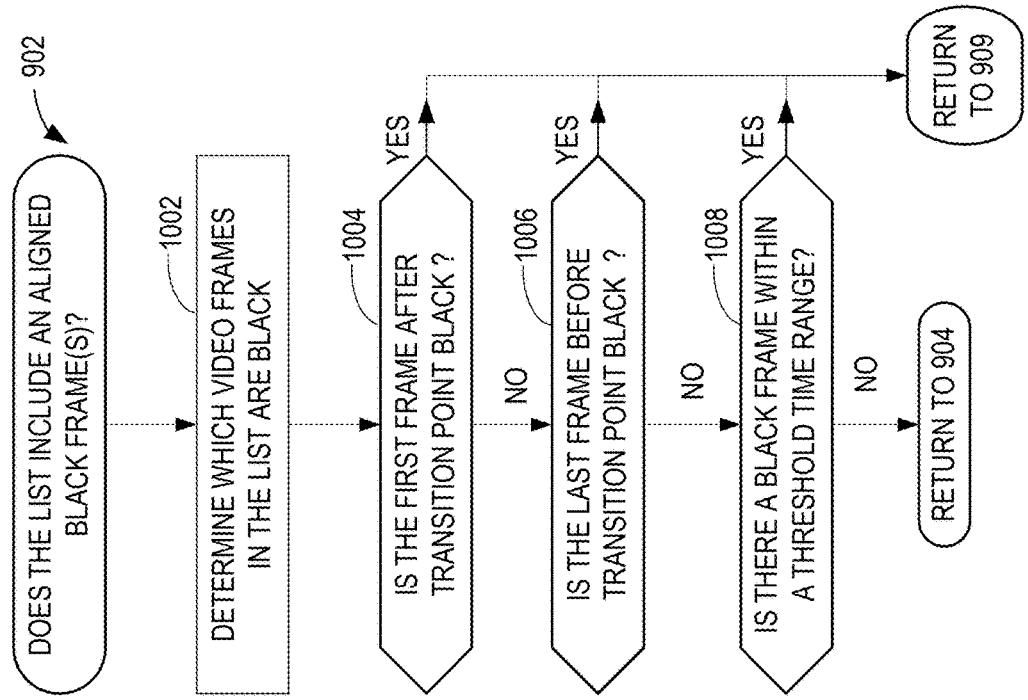
FIG. 10 is a flowchart representative of example machine-readable instructions and/or example operations that may be executed, instantiated, and/or performed by example programmable circuitry to check for aligned black frames as described in FIG. 9.

FIG. 10 is a flowchart representative of example machine-readable instructions and/or example operations that may be executed, instantiated, and/or performed by example programmable circuitry to check for an aligned black frame as described in FIG. 9. In particular, FIG. 10 is an example implementation of block 902 of FIG. 9.

Execution of block 902 begins when the black frame detector circuitry 210 determines which video frames in the list are black. (Block 1002). As used above and herein, a video frame refers to a single image that, when played in sequence with other video frames in a video file, creates the illusion of motion. A given video segment within the list may contain hundreds or thousands of video frames, depending on the frame rate of the video file and the length of the video file. To determine which video frames are black, the black frame detector circuitry 210 may perform a color analysis to determine the average color code (e.g., Red, Green, and Blue (RGB) values, hex values, etc.) of the pixels within a video frame. The black frame detector circuitry 210 may consider the video frame to be black if the average color code of pixels within the video frame are within a threshold range of the color code representing true black (e.g., (0,0,0) in RGB or #000000 in hex). The black frame detector circuitry 210 also provides the alignment checker circuitry 204 with results (via the bus 200) at block 1002. Such results may include timestamps, index values, and/or other parameters used to identify the specific video frames within a particular video segment that are considered black.

In examples described herein, the black frame detector circuitry 210 uses any suitable open-source video processing library to perform the color analysis and identify black frames. In other examples, the black frame detector circuitry 210 implements a different technique to perform the foregoing color analysis for black frames. The different techniques include but are not limited to remote execution of a ML model, local execution of a ML model using the ML circuitry 208, etc.

The alignment checker circuitry 204 determines whether the first frame after the transition point is black. (Block 1004). As used herein, a transition point refers to a point in time where the OTT stream transitions from a content segment to a DAI segment, or vice versa. Thus, in the example of FIG. 7, the transition point of the first list is at T4, and the transition point of the second list is at T7. Accordingly, the video frame of block 1004 is the first frame of DAI segment 710 when black frame detector circuitry 210 analyzes the first list of FIG. 7. Similarly, the video frame of block 1004 is the first frame of content segment 718 when the black frame detector circuitry 210 analyzes the second list of FIG. 7.

If the first frame after the transition point is black (Block 1004: Yes), there is at least one black frame between the color frames of the content and the color frames of the DAI. In such a situation, the position of the black frame prevents a sudden transition between color frames from two different sources (e.g., the content provider 102A and the advertisement server 112). Thus, the alignment checker circuitry 204 considers the transition within the list to pass the quality threshold, and control returns to block 909.

If the first frame after the transition point is not black (Block 1004: No), the black frame detector circuitry 210 determines whether the last frame before the transition point is black. (Block 1006). For example, the video frame of block 1006 is the last frame of content segment 708 when black frame detector circuitry 210 analyzes the first list of FIG. 7. Similarly, the video frame of block 1004 is the last frame of DAI segment 716 when the black frame detector circuitry 210 analyzes the second list of FIG. 7.

If the last frame after the transition point is black (Block 1006: Yes), control returns to block 909 for the same reasons provided above with respect to block 1004. If the last frame after the transition point is not black (Block 1006: No), the alignment checker circuitry 204 determines whether there is a black frame within a threshold time range of the transition point. (Block 1008). The alignment checker circuitry 204 considers a black frame that satisfies block 1008 to be sufficiently close in time to the transition point such that, when the video frames are played in rapid succession (e.g., at 32 or 64 frames per second) on the client device 114A, a user would not perceive a disorienting or confusing transition between the content and the DAI due to the proximity of the black frame. Accordingly, if there is a black frame within the threshold time range of the transition point, (Block 1008: Yes), the transition is considered properly aligned and control returns to block 909. Alternatively, if a black frame does not exist within the threshold time range of the transition point (Block 1008: No), control returns to block 904.

The managing organization sets the threshold time range of block 1008 by storing a configuration parameter in memory 216 that is accessible to the alignment checker circuitry 204. In some examples, the managing organization determines the value of the threshold time range based on feedback from users.

Figure 11:
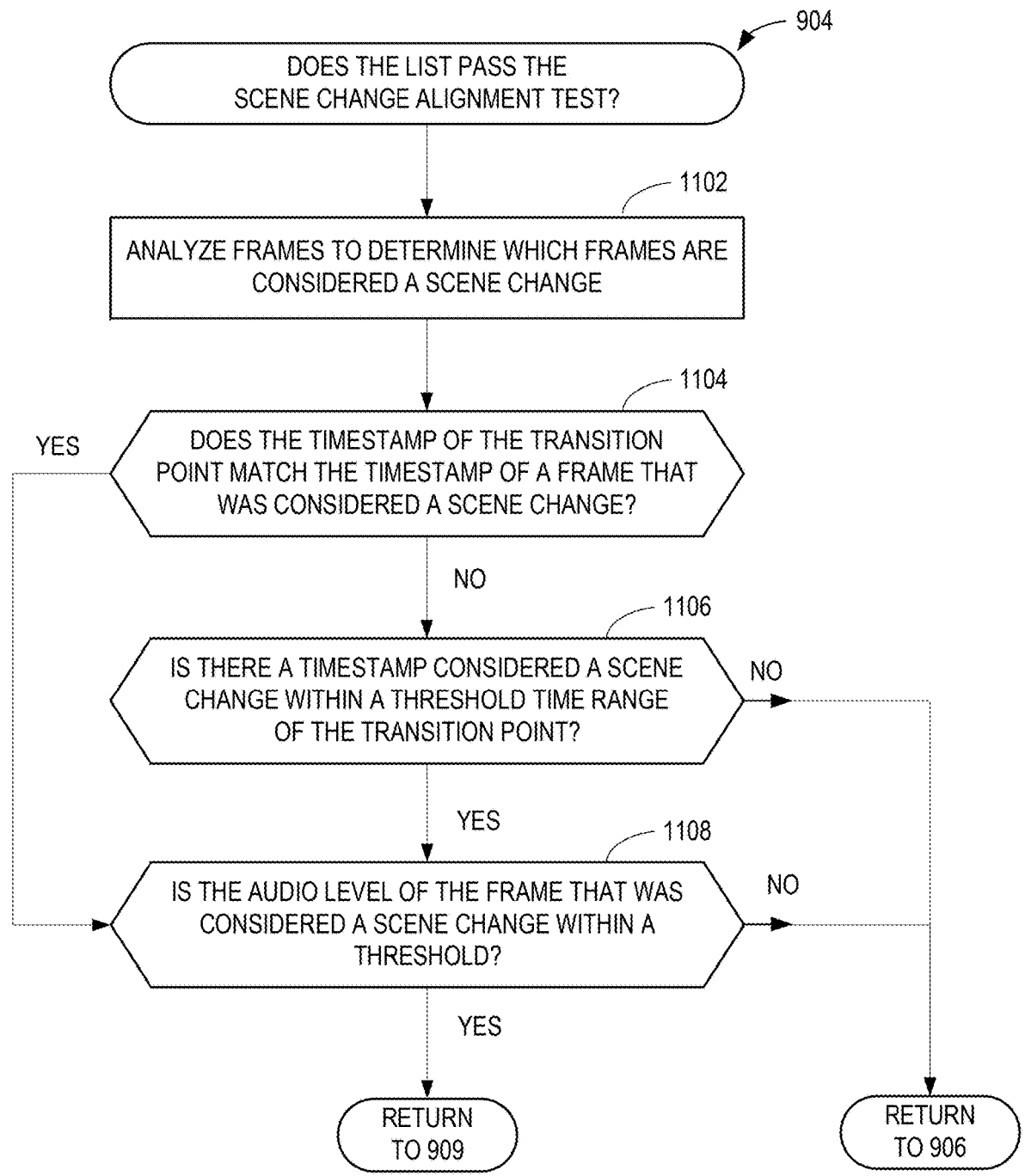
FIG. 11 is a flowchart representative of example machine-readable instructions and/or example operations that may be executed, instantiated, and/or performed by example programmable circuitry to implement a scene change alignment test as described in FIG. 9.

FIG. 11 is a flowchart representative of example machine-readable instructions and/or example operations that may be executed, instantiated, and/or performed by example programmable circuitry to implement a scene change alignment test as described in FIG. 9. In particular, the flowchart of FIG. 11 is an example implementation of block 904 of FIG. 9.

Execution of block 904 begins when the scene change detector circuitry 214 determines, based on image data in the video frames in the list, which frames are considered a scene change. (Block 1102). To categorize a frame as the start of a scene change, the scene change detector circuitry 214 may extract features from the frame (e.g., foreground objects, background objects, edges of the objects, etc.) and compares the properties of the features (e.g., position, colors, quantity, contextual information such as characters, setting, etc.) to the features from the adjacent frames. The scene change detector circuitry 214 may additionally or alternatively use a different suitable technique to categorize a frame as the start of a new scene.

In examples described herein, the black frame detector circuitry 210 uses any suitable open-source video processing library to identify scene changes at block 1102. In other examples, the scene change detector circuitry 214 uses a ML model to identify scene changes. In such examples, the scene change detector circuitry 214 may perform a function call to cause remote execution of a model or communicate with the ML circuitry 208 to cause local execution of a model.

The alignment checker circuitry 204 determines whether the timestamp of the transition point matches the timestamp of a frame that was considered a scene change. (Block 1104). If the timestamp of the transition point (e.g., T4 in the first list of FIGS. 7 and T7 in the second list of FIG. 7) is considered a scene change (Block 1104: Yes), the transition is aligned between two image frames that the scene change detector circuitry 214 identifies as part of two separate scenes. In such examples, control proceeds to block 1108.

If the timestamp of the transition point is not considered a scene change (Block 1104: No), the alignment checker circuitry 204 determines whether there is a timestamp considered a scene change within a threshold time range of the transition point. (Block 1106). The alignment checker circuitry 204 considers a frame that satisfies block 1106 to be sufficiently close in time to the transition point such that, when the video frames are played in rapid succession on the client device 114A, a user would not perceive a disorienting or confusing transition between the content and the DAI due to the proximity of the scene change frame. Accordingly, if there is a scene change frame within the threshold time range of the transition point, (Block 1106: Yes), control proceeds to block 1108. If there is no scene change frame within the threshold time range of the transition point (Block 1106: No), then the transition point is not sufficiently close to a scene change, a black frame (as discussed in FIG. 10), or bumper sequence (FIG. 11) to avoid degrading user experience. Accordingly, the alignment checker circuitry 204 identifies the transition in the list of video segments to be a DAI misalignment in such examples and control returns to block 906 of FIG. 9.

If the timestamp of the transition point is considered a scene change (Block 1104: Yes), or if the timestamp considered a scene change is within a threshold time range of the transition point (Block 1106: Yes), then the scene change detector circuitry 214 determines whether the audio level of frame considered a scene change is less than a threshold. (Block 1108). In some examples, the scene change detector circuitry 214 may inadvertently identify as a scene change when performing analysis solely on the images within a frame. However, audio can be used as a parameter to correct such misidentification because video frames with scene changes generally have lower audio levels than video frames that occur during a scene. Accordingly, if the scene change detector circuitry 214 determines the audio level of the frame is within (e.g., less than or equal to) a threshold value, (Block 1108: Yes), the alignment checker circuitry 204 considers: a) the scene change detector circuitry 214 to have correctly identified a scene change, and b) the scene change to be properly aligned with the transition point. In such examples, control returns to block 909. Alternatively, if the scene change detector circuitry 214 determines the audio level of the frame is outside (e.g., greater than) the threshold value, (Block 1108: No), control returns to block 906 because the frame identified using only visual analysis was incorrectly identified as a scene change.

FIG. 12 is a flowchart representative of example machine-readable instructions and/or example operations that may be executed, instantiated, and/or performed by example programmable circuitry to check whether the list includes a low priority sequence as described in FIG. 9. In particular, the flowchart of FIG. 12 is an example implementation of block 906.

Execution of block 906 begins when the bumper detector circuitry 212 resets the counter value that was used in a previous iteration of block 906. (Block 1202). The counter value is an integer value that is stored in the memory 216 and is editable by the bumper detector circuitry 212.

The bumper detector circuitry 212 saves a number of frames before and after the transition point as images. (Block 1204). The managing organization sets the number of frames saved at block 1204 by storing a configuration parameter in the memory 216. The managing organization determines the number of frames based on any number of factors. Such factors may include but are not limited to the amount of memory 216 available, a desired accuracy and/or run time for DAI misalignment operations, etc.

The bumper detector circuitry 212 counts the number of consecutive similar images that have been saved. (Block 1206). To do so, the bumper detector circuitry 212 analyzes the saved images in chronological order based on the timing data provided in the manifest file. For example, the bumper detector circuitry 212 determines a similarity score of the first and second saved images and increments the counter value if the similarity score is above a threshold. The bumper detector circuitry 212 then determines a similarity score of the second and third saved images and increments the counter value again if the similarity score is above the threshold. Alternatively, if the similarity score of the second and third images are not above the threshold, the bumper detector circuitry 212 resets the counter value. The bumper detector circuitry 212 continues to implement the foregoing analysis until a similarity score has been computed for every pair of adjacent images.

As used above and herein, a similarity score refers to a value that quantifies the visual similarity between two images. A similarity score may be implemented, for example, as a percentage where 100% corresponds to two images that are visually identical. In some examples, the bumper detector circuitry 212 determines the similarity score by executing a machine learning model to calculate a Structural Similarity Index Measure (SSIM) as first introduced in the 2004 Institute of Electricians and Electrical Engineers (IEEE) paper "Image Quality Assessment: From Error Visibility to Structural Similarity". In other examples, the bumper detector circuitry 212 uses a different technique to quantify the visual similarity between two images. In some examples, the bumper detector circuitry 212 performs a function call to cause execution of the machine learning model on an external device. In other examples, the bumper detector circuitry 212 causes local execution of a model (e.g., using the ML circuitry 208) to determine the SSIM.

The alignment checker circuitry 204 determines whether the counter value is above a threshold. (Block 1208). If the counter value is not above the threshold (Block 1208: No), the list does not contain a bumper sequence and control returns to block 907 of FIG. 9.

Alternatively, if the counter value is above a threshold (Block 1208: Yes), then the list of video segments contains a series of similar images in consecutive order that can collectively be considered a bumper sequence. The bumper sequence may either be high priority or low priority. In examples described herein, a high priority bumper sequence is one that a DAI segment cannot cut-off without causing DAI misalignment. In contrast, a low priority bumper sequence is one that a DAI segment can cut-off without causing DAI misalignment. Examples of high priority and low priority bumper sequences are discussed further in connection with FIG. 13.

In response to the alignment checker circuitry 204 determining the counter value is above a threshold (Block 1208: Yes), the ML circuitry 208 determines whether the bumper sequence is low priority. The ML circuitry 208 may use any number of factors to determine the priority of a bumper sequence. Examples of such factors are discussed further in connection with FIG. 13.

If the ML circuitry 208 categorizes the bumper sequence as low priority (Block 1210: Yes), control returns to block 909 because the existence and positioning of the low priority bumper sequence means that the transition within the list of video segments is properly aligned. If the ML circuitry 208 instead categorizes the bumper sequence as high priority (Block 1210: No), the list does not satisfy the quality threshold and control returns to block 907.

FIG. 13 is an illustrative example of operations that may be performed by the machine learning circuitry 208 of FIG. 2. FIG. 13 includes example video frames 1302 and 1304.

In general, detecting a series of consecutive similar images as described in FIG. 11 is likely to correspond to a properly aligned DAI transition. For example, frame 1302 is an example of a video frame that is likely to appear before a transition to a DAI segment. If the bumper detector circuitry 212 detects a number of consecutive frames before and/or after frame 1302 with substantially similar images, the flowchart of FIG. 11 can successfully be used to identify a properly aligned DAI transition. The alignment checker circuitry 204 would consider the DAI properly aligned because the bumper sequence including frame 1302 merely presents a station logo. Accordingly, the DAI segment can cut-off the bumper sequence with frame 1302 at any time, or overlap the bumper sequence with frame 1302 entirely, without confusing or distracting a user.

In some examples, a series of consecutive similar images is not enough by itself to detect DAI misalignment. For example, frame 1304 is an example of a video frame that is likely to appear before a transition to a DAI segment. In the example of FIG. 13, the frame 1304 is part of a video sequence that previews an upcoming news story scheduled to appear in the OTT stream after the upcoming DAI segment.

Unlike frame 1302, the frame 1304 includes a relatively small logo positioned in the corner of the frame. Instead of the logo, the subject of frame 1304 is two people talking (e.g., the subjects of the upcoming news story). Using the flowchart of FIG. 11, the alignment checker circuitry 204 may identify a DAI that cuts into the video sequence with frame 1304 as properly aligned. Such an identification occurs in a situation where the images before and/or after the frame 1304 are substantially similar to frame 1304 (e.g., the preview stays on a shot of the two people speaking).

While the video sequence including frame 1302 may contain no audio or audio with theme music, the video sequence with frame 1304 includes narrative audio (e.g. a description of the upcoming news sequence and a portion of the conversation with the two people). As such, a DAI segment that cuts-off part of the video sequence with frame 1302 would be improperly aligned because it would unexpectedly interrupt the preview of the upcoming news sequence, thereby causing confusion to the user.

To counteract improper DAI alignment with a series of consecutive similar images, the alignment checker circuitry 204 may additionally or alternatively use the ML circuitry 208 to detect bumper sequences that can be cut-off or replaced by DAI segments. In such examples the ML circuitry 208 may train a model using both video sequences of FIG. 13 as examples of video sequences that can and cannot be cut-off by a DAI segment.

In examples described herein, the ML circuitry 208 trains the model to: a) identify logos within a frame, and b) measure the size of the logo relative to the size of the frame. For example, the ML circuitry 208 may determine the logo in frame 1302 fills approximately 50% of frame 1302 and determine the logo in frame 1302 fills approximately 2% of frame 1304. The ML circuitry 208 may then identify a bumper sequence as low priority (and therefore can be cut-off by DAI segments) if the size of the logo relative to the size of the corresponding frame is above a threshold.

More generally, the alignment checker circuitry 204 may use the ML circuitry 208 in a variety of ways to assist in the identification of DAI misalignment. For example, the ML circuitry 208 may train and/or execute one or more models to detect bumper sequences that can be cut-off, detect substantially similar video frames (as an input to the bumper sequence detection), or detect scene changes as discussed above.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In the examples disclosed herein, the ML circuitry 208 uses a neural network. Using a neural network enables the ML circuitry 208 to extract high level features from input data (e.g., video frames), thereby supporting image classification and object detection operations. However, other types of machine learning models could additionally or alternatively be used such as decision trees, k-nearest neighbors techniques, support vector machines, linear regression techniques, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, the ML circuitry 208 trains models are trained using stochastic gradient descent. However, any other training algorithm may additionally or alternatively be used. In examples disclosed herein, training is performed until an acceptable amount of error is achieved. In examples disclosed herein, training is performed locally at a backend server 106 controlled by a managing organization. Training is performed using hyperparameters that control how the learning is performed (e.g., a learning rate, a number of layers to be used in the machine learning model, etc.). In some examples retraining may be performed. Such re-training may be performed in response to model accuracy as determined by user feedback.

Training is performed using training data. In examples disclosed herein, the training data originates from OTT streams and corresponding metadata. Because supervised training is used, the training data is labeled. Labeling is applied to the training data by content providers 102 and the advertisement server 112.

Once training is complete, the model is deployed for use as an executable construct that processes an input and provides an output based on the network of nodes and connections defined in the model. The model is stored in the memory 216. The model may then be executed by the ML circuitry 208.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Figure 14:
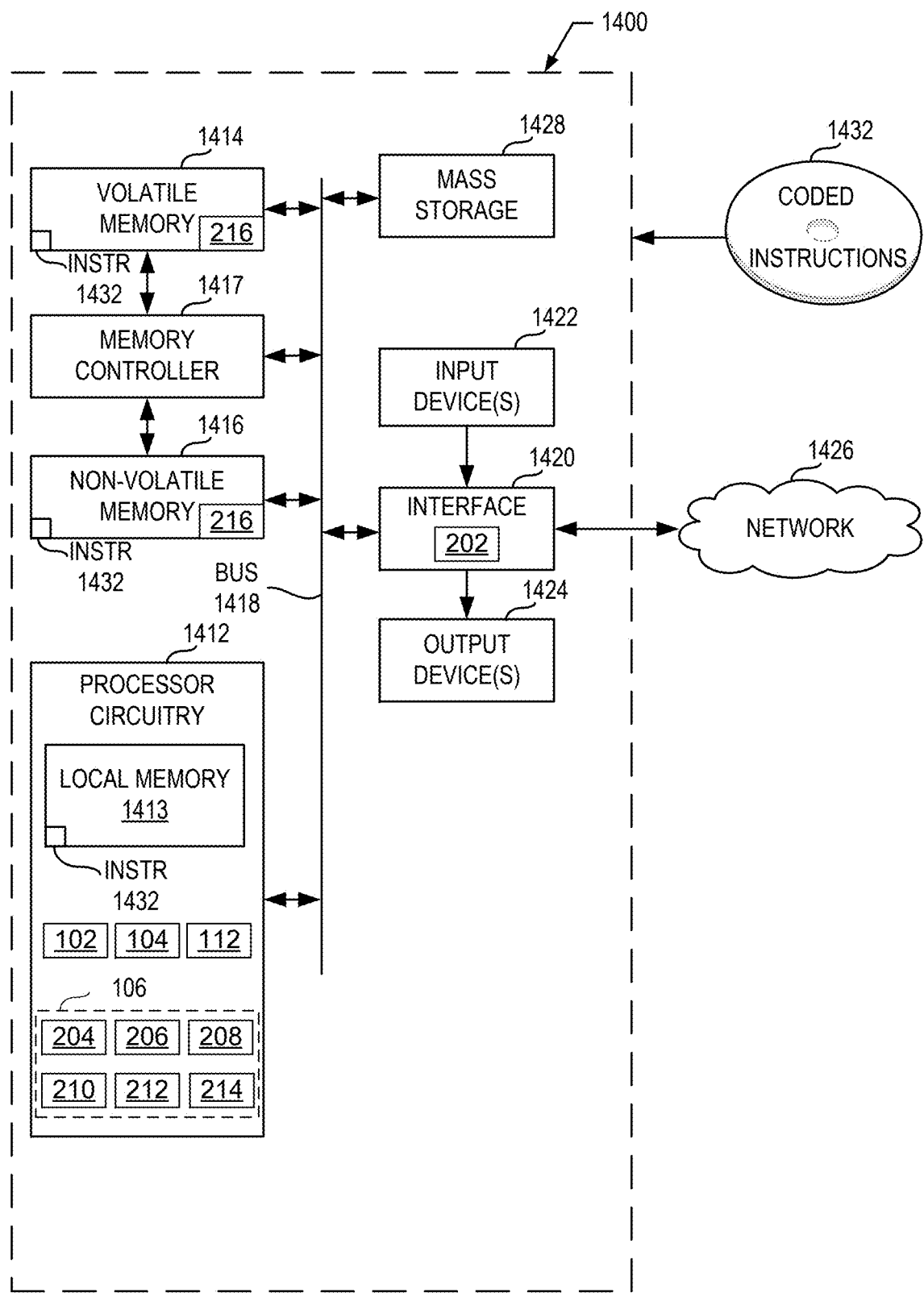
FIG. 14 is a block diagram of an example processing platform including programmable circuitry structured to execute, instantiate, and/or perform the example machine-readable instructions and/or perform the example operations of FIGS. 8-12 to implement the backend server 106 of FIG. 2.

FIG. 14 is a block diagram of an example programmable circuitry platform 1400 structured to execute and/or instantiate the example machine-readable instructions and/or the example operations of FIGS. 8-12 to implement the backend server 106 of FIG. 2. The programmable circuitry platform 1400 can be, for example, a server, a personal computer, a workstation, a self-learning machine (e.g., a neural network, or any other type of computing and/or electronic device. In some examples, the programmable circuitry implements one or more of the content providers 102, the content processor circuitry 104, and the backend server 106.

The programmable circuitry platform 1400 of the illustrated example includes programmable circuitry 1412. The programmable circuitry 1412 of the illustrated example is hardware. For example, the programmable circuitry 1412 can be implemented by one or more integrated circuits, logic circuits, FPGAs, microprocessors, CPUs, GPUs, DSPs, and/ or microcontrollers from any desired family or manufacturer. The programmable circuitry 1412 may be implemented by one or more semiconductor based (e.g., silicon based) devices. In this example, the programmable circuitry 1412 implements one or more of the content providers 102, the content processor circuitry 104, the advertisement server 112, the content processor circuitry 104, the alignment checker circuitry 204, the list generator circuitry 206, the ML circuitry 208, the black frame detector circuitry 210, the bumper detector circuitry 212, and the scene change detector circuitry 214.

The programmable circuitry 1412 of the illustrated example includes a local memory 1413 (e.g., a cache, registers, etc.). The programmable circuitry 1412 of the illustrated example is in communication with main memory 1414, 1416, which includes a volatile memory 1414 and a non-volatile memory 1416, by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417. In some examples, the memory controller 1417 may be implemented by one or more integrated circuits, logic circuits, microcontrollers from any desired family or manufacturer, or any other type of circuitry to manage the flow of data going to and from the main memory 1414, 1416. In this example, the main memory 1414, 1416 implements the memory 216.

The programmable circuitry platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuitry 1420 implements the network interface circuitry 202.

In the illustrated example, one or more input devices 1422 are connected to the interface circuitry 1420. The input device(s) 1422 permit(s) a user (e.g., a human user, a machine user, etc.) to enter data and/or commands into the programmable circuitry 1412. The input device(s) 1422 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1424 are also connected to the interface circuitry 1420 of the illustrated example. The output device(s) 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1400 of the illustrated example also includes one or more mass storage discs or devices 1428 to store firmware, software, and/or data. Examples of such mass storage discs or devices 1428 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 1432, which may be implemented by the machine-readable instructions of FIGS. 8-12, may be stored in the mass storage device 1428, in the volatile memory 1414, in the non-volatile memory 1416, and/or on at least one non-transitory computer readable storage medium such as a CD or DVD which may be removable.

Figure 15:
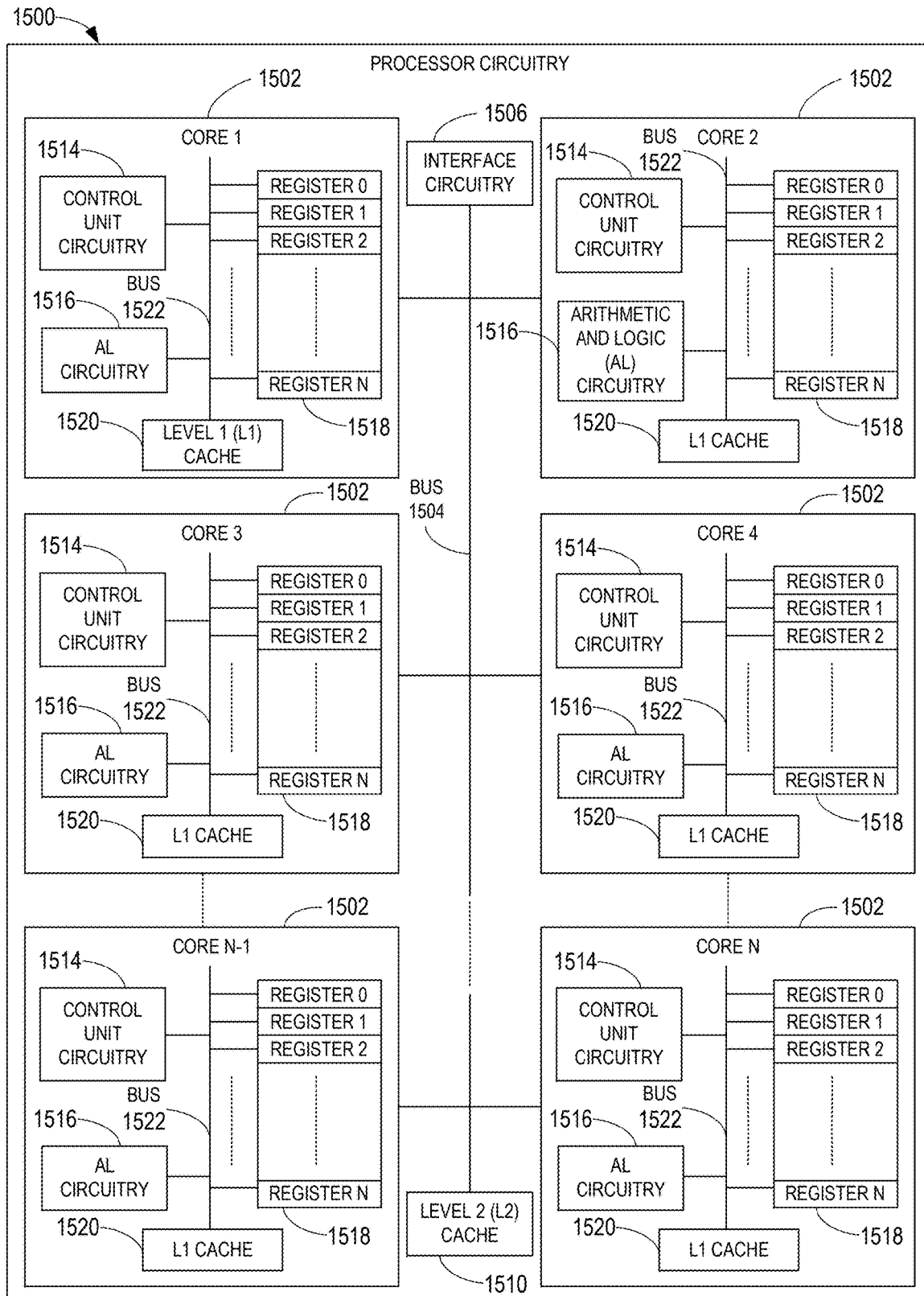
FIG. 15 is a block diagram of an example implementation of the programmable circuitry of FIG. 14.

FIG. 15 is a block diagram of an example implementation of the programmable circuitry 1412 of FIG. 14. In this example, the programmable circuitry 1412 of FIG. 14 is implemented by a microprocessor 1500. For example, the microprocessor 1500 may be a general-purpose microprocessor (e.g., general-purpose microprocessor circuitry). The microprocessor 1500 executes some or all of the machine-readable instructions of the flowcharts of FIGS. 8-12 to effectively instantiate the circuitry of FIG. 2 as logic circuits to perform operations corresponding to those machine-readable instructions. In some such examples, the circuitry of FIG. 2 is instantiated by the hardware circuits of the microprocessor 1500 in combination with the machine-readable instructions. For example, the microprocessor 1500 may be implemented by multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine-readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine-readable instructions and/or operations represented by the flowcharts of FIGS. 8-12.

The cores 1502 may communicate by a first example bus 1504. In some examples, the first bus 1504 may be implemented by a communication bus to effectuate communication associated with one(s) of the cores 1502. For example, the first bus 1504 may be implemented by at least one of an Inter-Integrated Circuit (I2C) bus, a Serial Peripheral Interface (SPI) bus, a PCI bus, or a PCIe bus. Additionally or alternatively, the first bus 1504 may be implemented by any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2 cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the local memory 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer-based operations. In other examples, the AL circuitry 1516 also performs floating-point operations. In yet other examples, the AL circuitry 1516 may include first AL circuitry that performs integer-based operations and second AL circuitry that performs floating-point operations. In some examples, the AL circuitry 1516 may be referred to as an Arithmetic Logic Unit (ALU).

The registers 1518 are semiconductor-based structures to store data and/or instructions such as results of one or more of the operations performed by the AL circuitry 1516 of the corresponding core 1502. For example, the registers 1518 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure, such as by being distributed throughout the core 1502 to shorten access time. The second bus 1522 may be implemented by at least one of an I2C bus, a SPI bus, a PCI bus, or a PCIe bus.

Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages.

The microprocessor 1500 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or another programmable device can also be an accelerator. Accelerators may be on-board the microprocessor 1500, in the same chip package as the microprocessor 1500 and/or in one or more separate packages from the microprocessor 1500.

Figure 16:
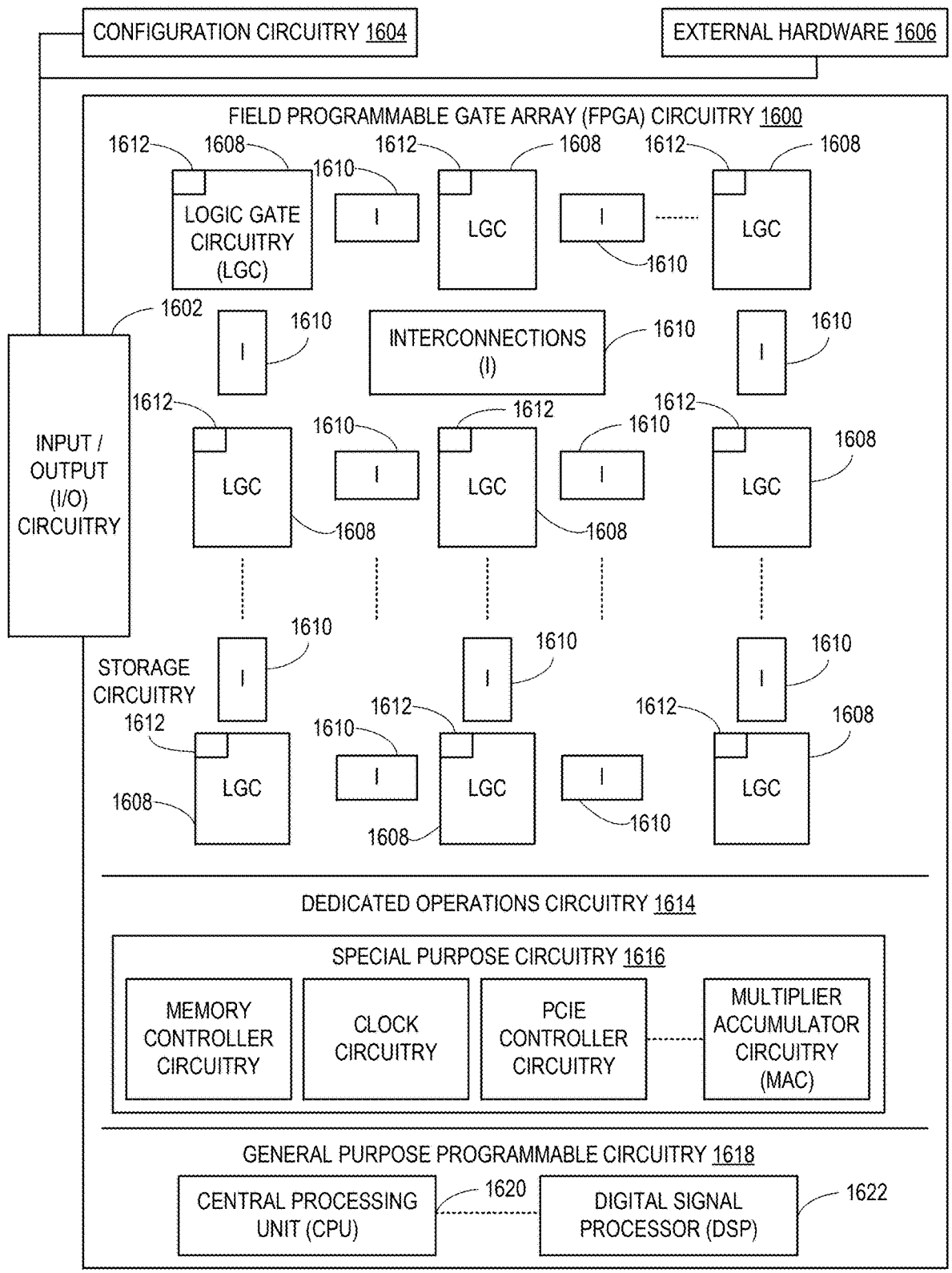
FIG. 16 is a block diagram of another example implementation of the programmable circuitry of FIG. 14.

FIG. 16 is a block diagram of another example implementation of the programmable circuitry 1412 of FIG. 14. In this example, the programmable circuitry 1412 is implemented by FPGA circuitry 1600. For example, the FPGA circuitry 1600 may be implemented by an FPGA. The FPGA circuitry 1600 can be used, for example, to perform operations that could otherwise be performed by the example microprocessor 1500 of FIG. 15 executing corresponding machine-readable instructions. However, once configured, the FPGA circuitry 1600 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 1500 of FIG. 15 described above (which is a general purpose device that may be programmed to execute some or all of the machine-readable instructions represented by the flowchart(s) of FIGS. 8-12 but whose interconnections and logic circuitry are fixed once fabricated), the FPGA circuitry 1600 of the example of FIG. 16 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 8-12. In particular, the FPGA circuitry 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 8-12. As such, the FPGA circuitry 1600 may be configured and/or structured to effectively instantiate some or all of the operations/functions corresponding to the machine-readable instructions of the flowchart(s) of FIGS. 8-12 as dedicated logic circuits to perform the operations/functions corresponding to those software instructions in a dedicated manner analogous to an ASIC. Therefore, the FPGA circuitry 1600 may perform the operations/functions corresponding to the some or all of the machine-readable instructions of FIGS. 8-12 faster than the general-purpose microprocessor can execute the same.

In the example of FIG. 16, the FPGA circuitry 1600 is configured and/or structured in response to being programmed (and/or reprogrammed one or more times) based on a binary file. In some examples, the binary file may be compiled and/or generated based on instructions in a hardware description language (HDL) such as Lucid, Very High-Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1600 of FIG. 16 may access and/or load the binary file to cause the FPGA circuitry 1600 of FIG. 16 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1600 of FIG. 16 to cause configuration and/or structuring of the FPGA circuitry 1600 of FIG. 16, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1600 of FIG. 16 may access and/or load the binary file to cause the FPGA circuitry 1600 of FIG. 16 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1600 of FIG. 16 to cause configuration and/or structuring of the FPGA circuitry 1600 of FIG. 16, or portion(s) thereof.

The FPGA circuitry 1600 of FIG. 16, includes example input/output (I/O) circuitry 1602 to obtain and/or output data to/from example configuration circuitry 1604 and/or external hardware 1606. For example, the configuration circuitry 1604 may be implemented by interface circuitry that may obtain a binary file, which may be implemented by a bit stream, data, and/or machine-readable instructions, to configure the FPGA circuitry 1600, or portion(s) thereof. In some such examples, the configuration circuitry 1604 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1606 may be implemented by external hardware circuitry. For example, the external hardware 1606 may be implemented by the microprocessor 1500 of FIG. 15.

The FPGA circuitry 1600 also includes an array of example logic gate circuitry 1608, a plurality of example configurable interconnections 1610, and example storage circuitry 1612. The logic gate circuitry 1608 and the configurable interconnections 1610 are configurable to instantiate one or more operations/functions that may correspond to at least some of the machine-readable instructions of FIGS. 8-12 and/or other desired operations. The logic gate circuitry 1608 shown in FIG. 16 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations/functions. The logic gate circuitry 1608 may include other electrical structures such as look-up tables (LUTs), registers (e.g., flip-flops or latches), multiplexers, etc.

The configurable interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example dedicated operations circuitry 1614. In this example, the dedicated operations circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the programmable circuitry 1412 of FIG. 14, many other approaches are contemplated. For example, FPGA circuitry may include an on-board CPU, such as one or more of the example CPU 1620 of FIG. 15. Therefore, the programmable circuitry 1412 of FIG. 14 may additionally be implemented by combining at least the example microprocessor 1500 of FIG. 15 and the example FPGA circuitry 1600 of FIG. 16. In some such hybrid examples, one or more cores 1502 of FIG. 15 may execute a first portion of the machine-readable instructions represented by the flowchart(s) of FIGS. 8-12 to perform first operation(s)/function(s), the FPGA circuitry 1600 of FIG. 16 may be configured and/or structured to perform second operation(s)/function(s) corresponding to a second portion of the machine-readable instructions represented by the flowcharts of FIGS. 8-12, and/or an ASIC may be configured and/or structured to perform third operation(s)/function(s) corresponding to a third portion of the machine-readable instructions represented by the flowcharts of FIGS. 8-12.

It should be understood that some or all of the circuitry of FIG. 2 may, thus, be instantiated at the same or different times. For example, same and/or different portion(s) of the microprocessor 1500 of FIG. 15 may be programmed to execute portion(s) of machine-readable instructions at the same and/or different times. In some examples, same and/or different portion(s) of the FPGA circuitry 1600 of FIG. 16 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 1500 of FIG. 15 may execute machine-readable instructions in one or more threads executing concurrently and/or in series. In some examples, the FPGA circuitry 1600 of FIG. 16 may be configured and/or structured to carry out operations/functions concurrently and/or in series. Moreover, in some examples, some or all of the circuitry of FIG. 2 may be implemented within one or more virtual machines and/or containers executing on the microprocessor 1500 of FIG. 15.

In some examples, the programmable circuitry 1412 of FIG. 14 may be in one or more packages. For example, the microprocessor 1500 of FIG. 15 and/or the FPGA circuitry 1600 of FIG. 16 may be in one or more packages. In some examples, an XPU may be implemented by the programmable circuitry 1412 of FIG. 14, which may be in one or more packages. For example, the XPU may include a CPU (e.g., the microprocessor 1500 of FIG. 15, the CPU 1620 of FIG. 16, etc.) in one package, a DSP (e.g., the DSP 1622 of FIG. 16) in another package, a GPU in yet another package, and an FPGA (e.g., the FPGA circuitry 1600 of FIG. 16) in still yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that automatically identify DAI misalignment, thereby providing a solution with greater scalability, less cost, and more support for troubleshooting than other techniques. Disclosed systems, apparatus, articles of manufacture, and methods improve the efficiency of using a computing device by analyzing two lists of video segments to determine whether an aligned black frame(s), a low priority bumper sequence, or an aligned scene change exists, identifying either list as a misaligned DAI misaligned transition if the list lacks such characteristics, and providing statistics to support troubleshooting and correction of the error. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to identify advertisement misalignment, the apparatus comprising:
   interface circuitry;
   machine-readable instructions; and
   programmable circuitry to at least one of instantiate or execute the machine-readable instructions to:
   identify a timestamp using a manifest file of a video stream, the timestamp corresponding to a start of a dynamic advertisement insertion (DAI);
   form a list of consecutive video segments, the list including at least a content segment that ends at the timestamp and a DAI segment that begins at the timestamp;
   determine that a transition from the content segment to the DAI segment fails to satisfy a quality threshold, the failure based on a determination the transition does not include aligned black frames, a determination the transition does not include a low priority bumper sequence, and a determination the transition is misaligned with a scene change; and
   flag the timestamp as a misalignment.

2. The apparatus of claim 1, wherein the instructions cause the programmable circuitry to notify a content provider in response to the flag, the content provider to perform operations to correct the misalignment.

3. The apparatus of claim 1, wherein to determine the transition does not include aligned black frames, the instructions cause the programmable circuitry to:
   determine a first frame after the timestamp is not black;
   determine a last frame before the timestamp is not black; and
   determine a the list of video segments does not include a black frame within a threshold time range of the timestamp.

4. The apparatus of claim 1, wherein to determine the transition does not include a low priority bumper sequence, the instructions cause the programmable circuitry to:
   count a number of consecutive frames that are similar images to one another; and
   determine the number is less than a threshold value.

5. The apparatus of claim 1, wherein to determine the transition does not include a low priority bumper sequence, the instructions cause the programmable circuitry to:
   identify a bumper sequence by counting a number of consecutive frames that are similar images to one another;
   determine the bumper sequence includes a logo; and
   determine a size of the logo relative to a size of the corresponding frame is above a threshold.

6. The apparatus of claim 5, wherein the instructions cause the programmable circuitry to execute a machine learning model to perform one or more of:
   determine whether consecutive frames are similar images to one another;
   determine the bumper sequence includes a logo; and
   determine a size of the logo relative to a size of the corresponding frame is above a threshold.

7. The apparatus of claim 1, wherein:
   the timestamp is a first timestamp;
   to determine the scene change is misaligned with the transition, the instructions cause the programmable circuitry to:
   identify, based on image data within the list of video segments, a scene change at a second timestamp; and determine a difference between the first timestamp and the second timestamp is greater than a threshold.

8. The apparatus of claim 1, wherein
the timestamp is a first timestamp;
to determine the scene change is misaligned with the transition, the instructions cause the programmable circuitry to:
identify, based on image data within the list of video segments, a scene change at a second timestamp;
determine a difference between the first timestamp and the second timestamp is less than a threshold; and
determine that audio levels at the second timestamp exceed a threshold.

9. The apparatus of claim 1, wherein:
the list of video segments is a first list of video segments;
the transition is a first transition; and
the instructions cause the programmable circuitry to:
form a second list of consecutive video segments corresponding to a second timestamp where the DAI ends; and
determine whether a second transition from an end of the DAI to a resumption of the content segment satisfies a quality threshold.

10. The apparatus of claim 1, wherein the instructions cause the programmable circuitry to provide statistics regarding the transition from the content segment to the DAI segment in response to flagging the transition as a DAI misalignment.

11. A non-transitory machine-readable storage medium comprising instructions to cause programmable circuitry to at least:
identify a timestamp using a manifest file of a video stream, the timestamp corresponding to a start of a dynamic advertisement insertion (DAI);
form a list of consecutive video segments, the list including at least a content segment that ends at the timestamp and a DAI segment that begins at the timestamp;
determine that a transition from the content segment to the DAI segment fails to satisfy a quality threshold, the failure based on a determination the transition does not include aligned black frames, a determination the transition does not include a low priority bumper sequence, and a determination the transition is misaligned with a scene change; and
flag the timestamp as a misalignment.

12. The non-transitory machine-readable storage medium of claim 11, wherein the instructions cause the programmable circuitry to notify a content provider in response to the flag, the content provider to perform operations to correct the misalignment.

13. The non-transitory machine-readable storage medium of claim 11, wherein to determine the transition does not include aligned black frames, the instructions cause the programmable circuitry to:
determine a first frame after the timestamp is not black;
determine a last frame before the timestamp is not black; and
determine a the list of video segments does not include a black frame within a threshold time range of the timestamp.

14. The non-transitory machine-readable storage medium of claim 11, wherein to determine the transition does not include a low priority bumper sequence, the instructions cause the programmable circuitry to:
count a number of consecutive frames that are similar images to one another; and
determine the number is less than a threshold value.

15. The non-transitory machine-readable storage medium of claim 11, wherein to determine the transition does not include a low priority bumper sequence, the instructions cause the programmable circuitry to:
identify a bumper sequence by counting a number of consecutive frames that are similar images to one another;
determine the bumper sequence includes a logo; and
determine a size of the logo relative to a size of the corresponding frame is above a threshold.

16. The non-transitory machine-readable storage medium of claim 11, wherein:
the list of video segments is a first list of video segments;
the transition is a first transition; and
the instructions cause the programmable circuitry to:
form a second list of consecutive video segments corresponding to a second timestamp where the DAI ends; and
determine whether a second transition from an end of the DAI to a resumption of the content segment satisfies a quality threshold.

17. The non-transitory machine-readable storage medium of claim 15, wherein the instructions cause the programmable circuitry to execute a machine learning model to perform one or more of:
determine whether consecutive frames are similar images to one another;
determine the bumper sequence includes a logo; and
determine a size of the logo relative to a size of the corresponding frame is above a threshold.

18. The non-transitory machine-readable storage medium of claim 11, wherein:
the timestamp is a first timestamp;
to determine the scene change is misaligned with the transition, the instructions cause the programmable circuitry to:
identify, based on image data within the list of video segments, a scene change at a second timestamp; and
determine a difference between the first timestamp and the second timestamp is greater than a threshold.

19. A method to detect DAI misalignment, the method comprising:
identifying a timestamp using a manifest file of a video stream, the timestamp corresponding to a start of a dynamic advertisement insertion (DAI);
forming a list of consecutive video segments, the list including at least a content segment that ends at the timestamp and a DAI segment that begins at the timestamp;
determining, by performing operations with programmable circuitry, that a transition from the content segment to the DAI segment fails to satisfy a quality threshold, the operations with programmable circuitry to include:
determining the transition does not include aligned black frames;
determining the transition does not include a low priority bumper sequence; and
determining the transition is misaligned with a scene change; and
flagging the timestamp as a misalignment.

20. The method of claim 19, wherein determining the transition does not include aligned black frames includes:
determining a first frame after the timestamp is not black;
determining a last frame before the timestamp is not black; and determining a the list of video segments does not include a black frame within a threshold time range of the timestamp.

* * * * *